United States Patent [19]

Nakamura et al.

[11] Patent Number: 5,333,010
[45] Date of Patent: Jul. 26, 1994

[54] COLOR MISREGISTRATION EASING SYSTEM FOR A FIELD SEQUENTIAL ELECTRONIC ENDOSCOPE SYSTEM

[75] Inventors: Kazunari Nakamura, Hino; Kenji Matsunaka; Akira Watanabe, both of Hachioji, all of Japan

[73] Assignee: Olympus Optical Co., Ltd., Tokyo, Japan

[21] Appl. No.: 925,578

[22] Filed: Aug. 5, 1992

[30] Foreign Application Priority Data

Aug. 12, 1991 [JP] Japan .................................. 3-201970
Sep. 17, 1991 [JP] Japan .................................. 3-236624
Sep. 17, 1991 [JP] Japan .................................. 3-236628

[51] Int. Cl.$^5$ ................................................. H04N 9/093
[52] U.S. Cl. .......................................... 348/263; 348/70; 348/269; 348/649
[58] Field of Search ........................ 358/51, 41, 28, 10, 358/98, 21 R, 518, 520; H04N 9/093

[56] References Cited

U.S. PATENT DOCUMENTS 5,032,913 7/1991 Hattori et al. ..................... 358/98
5,164,824 11/1992 Ieoka .................................. 358/98

FOREIGN PATENT DOCUMENTS 2-27842 2/1990 Japan .
3-270392 12/1991 Japan .

*Primary Examiner*—James J. Groody
*Assistant Examiner*—Sherrie Hsia
*Attorney, Agent, or Firm*—Armstrong, Westerman, Hattori, McLeland & Naughton

[57] ABSTRACT

The present invention provides a color misregistration easing system for inputting a color image signal of a subject imaged by a field sequential type imaging device and carrying out color misregistration easing. The system comprises a color misregistration detector for using color difference signals and a luminance signal an encoder digitizes and outputs to calculate quantities of changes of color differences of time-series screens before and after, and detecting color misregistration according to the calculated quantities, an average color calculating circuit for producing averages of color differences, a decoder for using the average color differences and the luminance signal to generate a correction image signal for the subject, and a selector for outputting the correction image signal the decoder generates when the color misregistration detector determines that color misregistration is present, and outputting a color image signal when the color misregistration detector determines that color misregistration is absent. Herein, the averages of color differences are updated by the color misregistration detector only when color misregistration is not identified.

21 Claims, 22 Drawing Sheets

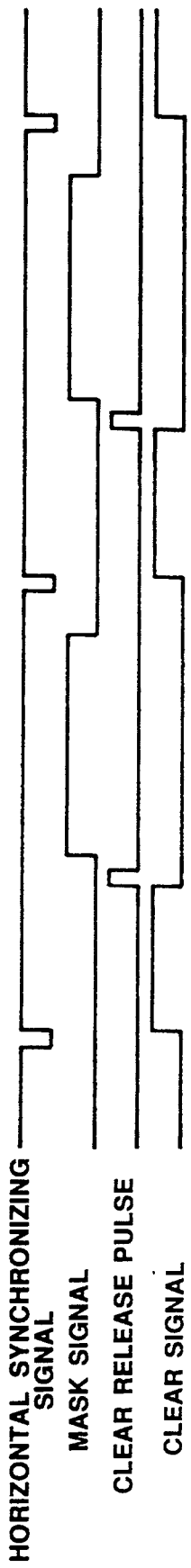
FIG.9(a) ONE-LINE INTEGRATION
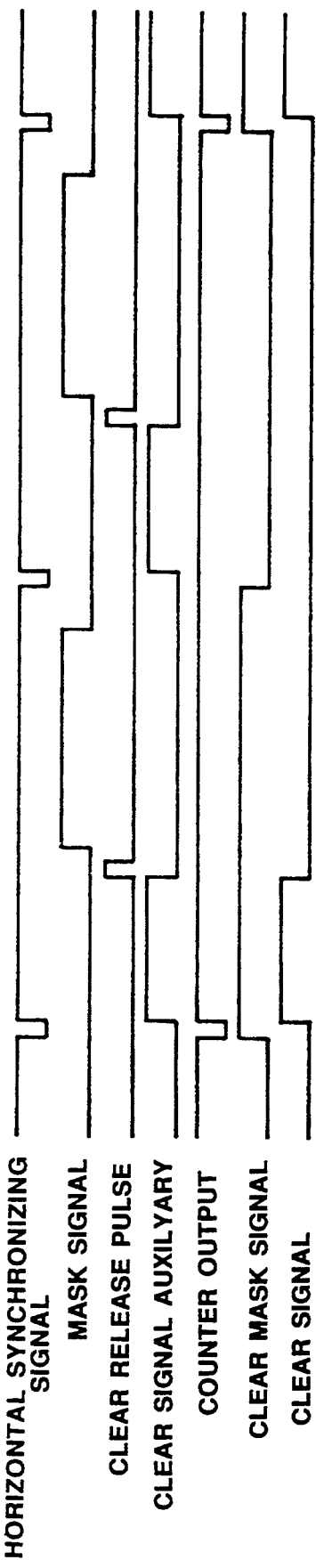
FIG.9(b) TWO-LINE INTEGRATION

FIG. 15(a)
ROM ADDRESS SPACE
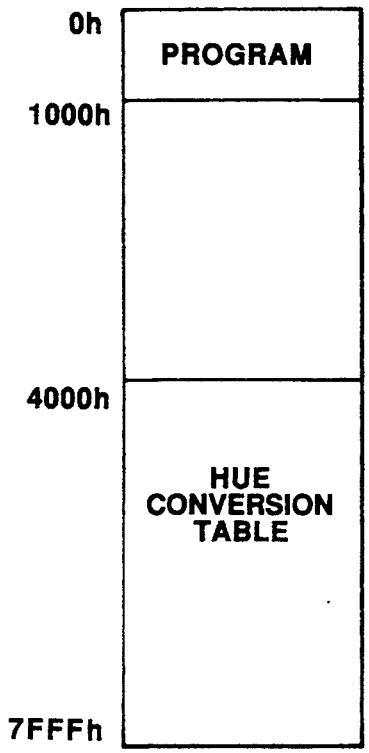
FIG. 15(b)
HUE CONVERSION BIT ALLOCATION
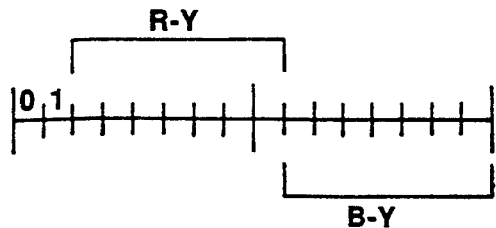
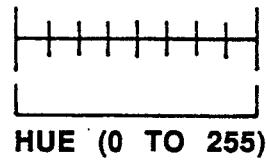
FIG. 15(c)
HUE DATA COLOR SPACE
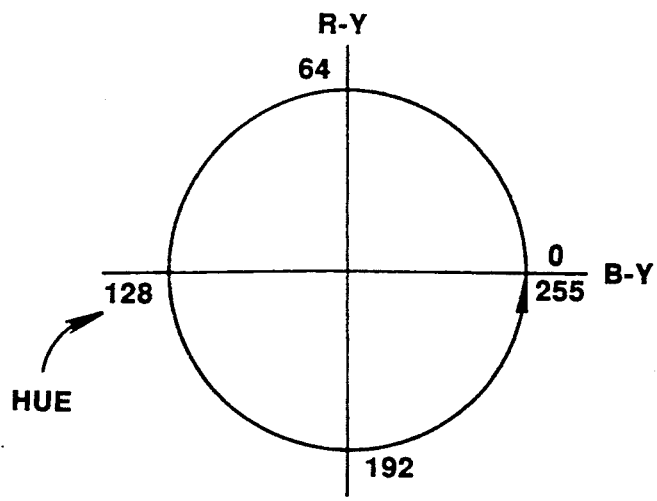

SINGLE-TRACE METHOD

MULTI-TRACE METHOD

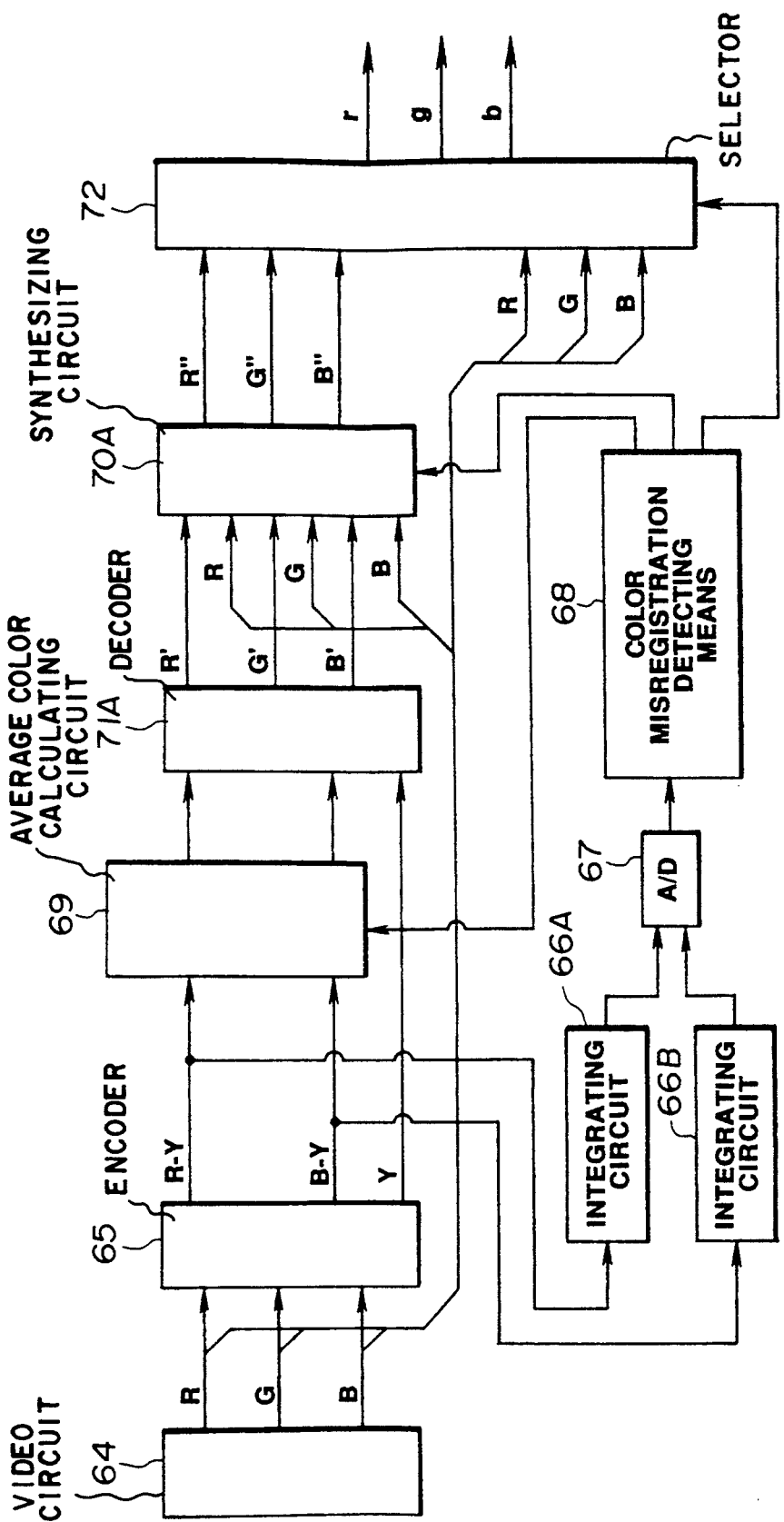

COLOR MISREGISTRATION EASING SYSTEM FOR A FIELD SEQUENTIAL ELECTRONIC ENDOSCOPE SYSTEM

BACKGROUND OF THE INVENTION

1. Field of the Invention

The present invention relates to a color misregistration easing system for easing color misregistration derived from field sequential imaging.

2. Description of the Related Art

An endoscope whose elongated insertion tube is inserted into a living body to observe a lesion or other subject has been adopted widely in recent years.

An electronic endoscope system in which a CCD or other solid state imaging device is used as an imaging means has also come into practical use recently.

The electronic endoscope system mentioned above includes a field sequential type electronic endoscope in which a subject is illuminated successively with illumination light of red, green, and blue rays having different wavelengths, and images produced under the rays of different wavelengths or component images are synthesized to produce a color image.

In such a field sequential type imaging system, unlike a simultaneous type imaging system in which white light is used as illumination light and a mosaic color filter is installed on the front of an imaging plane of a solid state imaging device, the solid state imaging device uses a larger number of imaging cells to receive light of one wavelength. Therefore, the imaging plane system permits higher resolution.

However, in the field sequential system, component color images that are produced at different times are synthesized to form a signal color image. Therefore, when a moving subject is imaged or an imaging means and a subject are moving relatively, a synthetic color image appears with colors different from the original colors of the subject.

In an electronic endoscope system, a mucosa may adhere to an objective at the tip of an endoscope. This disables accurate observation. In this case, water supply is executed; water will be jetted toward the objective from the distal end of the endoscope to clean the lens. During the water supply, water runs fiercely in front to the objective. Therefore, when the water is illuminated with the field sequential illumination light, it is seen with drastically-changed colors or is rainbow-colored. In some endoscopes, the water supply is carried out to wash or cool a region to be examined. FIG. 23 shows the endoscopy during water supply.

The principles of causing a color reproduction error will be described in conjunction with FIG. 23. When water is jetted from the distal end of an endoscope, the water runs quickly in front of an objective. When red (R) light is, for example, radiated, the water is visualized as red water (object) just coming out of the distal end of the endoscope. When green (G) light is radiated, a waterdrop moves on the lens surface and appears as a green object. When blue (B) light is radiated, the water is visualized as blue water that has moved farther. These color images are synthesized and displayed on a monitor.

Therefore, the water image is displayed in primary colors of red, green, blue, yellow, cyan, and magenta with high saturation. In short, the water image is rainbow-colored. Consequently, a doctor undertaking endoscopic examination suffers fatigued eyes. Hereafter, a color reproduction error resulting from a difference in time of sampling color information is referred to as color misregistration. The event causing the color misregistration includes the aforesaid movements as well as zooming.

In Japanese Patent Laid-Open No. 2-70644, the present applicant has proposed that color component signals are checked to identify color misregistration, and that when color misregistration is identified, a correction color signal produced with an actual luminance is supplied to ease the color misregistration.

In Japanese Patent Laid-Open No. 2-27843 (U.S. Pat. No. 5,032,913), the applicant has proposed incorporation of a water supply detecting means that receives an image signal from an electronic endoscope, and identifies color misregistration derived from the water supply. Thereby, only when it is determined that the water supply is under way, a correction color is displayed. Thus, only intense color misregistration is eased.

Alternatively, Japanese Patent Laid-Open 3-24513 has disclosed a color misregistration detector in which color difference signals of a current image are generated to calculate a hue, then the hue component is held.

An image produced during water supply or other image causing conspicuous color misregistration has a high saturation. Even in a general image, a bleeding region appears with a relatively high saturation.

However, in the aforesaid color misregistration detecting method, since only a difference of a hue component is detected to identify color misregistration, even negligible color misregistration is subjected to color misregistration easing. Therefore, color misregistration is detected at a level inconsistent with a level at which a sensory test has revealed that an observer discerns color misregistration. That is to say, even negligible color misregistration is identified as color misregistration. Even for color misregistration with which an observer is not annoyed, color misregistration easing is carried out.

In Japanese Patent Laid-Open No. 2-27842 (U.S. Pat. No. 5,032,913), data is kept updated even when intense color misregistration has occurred. When intense color misregistration occurs, average color differences of a screen (one field or one frame), which are used to produce the correction color, varies incessantly. Therefore, a stable correction color is unavailable.

The system disclosed in the Japanese Patent Laid-Open No. 2-27842 (U.S. Pat. No. 5,032,913) always applies an average color irrelative to a degree of color misregistration.

A system for easing color misregistration should, preferably, replace only an area of color misregistration in an image with a correction color. To detect the area of color misregistration and correct only the area, memory circuits and other digital circuits must be incorporated. This results in a large-sized and high-cost circuitry.

SUMMARY OF THE INVENTION

The object of the present invention is to provide a color misregistration easing system for easing color misregistration in an image produced by a field sequential type imaging system only when the color misregistration results from, for example, a water supply and exceeds a permissible level.

Another object of the present invention is to provide a color misregistration easing system capable of easing color misregistration without causing visual unnaturalness.

The other object of the present invention is to provide a color misregistration easing system capable of realizing a simple and low-cost circuitry for efficiently easing color misregistration in an image produced by a field sequential type imaging system.

The present invention provides a color misregistration easing system for inputting a color image signal of a subject imaged by a field sequential type imaging means and carrying out color misregistration easing. The color misregistration easing system of this invention comprises a detecting means for using a color image signal originating from the imaging means to calculate a quantity of a change of color information of time-series screens before and after, detecting color misregistration or an event leading to color misregistration according the calculated quantity, an average color information producing means for using the color image signal to produce an average of color information of part or the whole of a screen, and updating the average color information according to the quantity of a change of varying color information of time-series screens before and after in response to an instruction from the detecting means, a means for generating a correction image signal of the subject using the average of color information the average color information producing means produces, and a switching means for outputting the correction image signal the generating means provides when the detecting means determines presence of color misregistration, or outputting the color image signal when the detecting means determines absence of color misregistration.

The color misregistration easing system according to the present invention comprises a color misregistration value detecting means for using a color image signal originating from the imaging means to calculate a change of color information of time-series screens before and after, and detecting a quantity of color misregistration, and a color misregistration easing means for suppressing a quantity of color misregistration in the color image signal according to the quantity of color misregistration the color misregistration detecting means provides.

The other features and advantages of the present invention will be apparent in conjunction with the detailed description below.

BRIEF DESCRIPTION OF THE DRAWINGS

FIGS. 9(a) and (b) are timing charts of signals employed for the color difference component integrating circuit shown in FIG. 8;

FIGS. 15(a), (b) and (c) are explanatory diagrams showing hue table conversion using a ROM;

FIG. 18 is a block diagram showing a variant of a color misregistration easing system;

DETAILED DESCRIPTION OF THE PREFERRED EMBODIMENTS

Embodiments of the present invention will be described with reference to the drawings.

Figure 1:
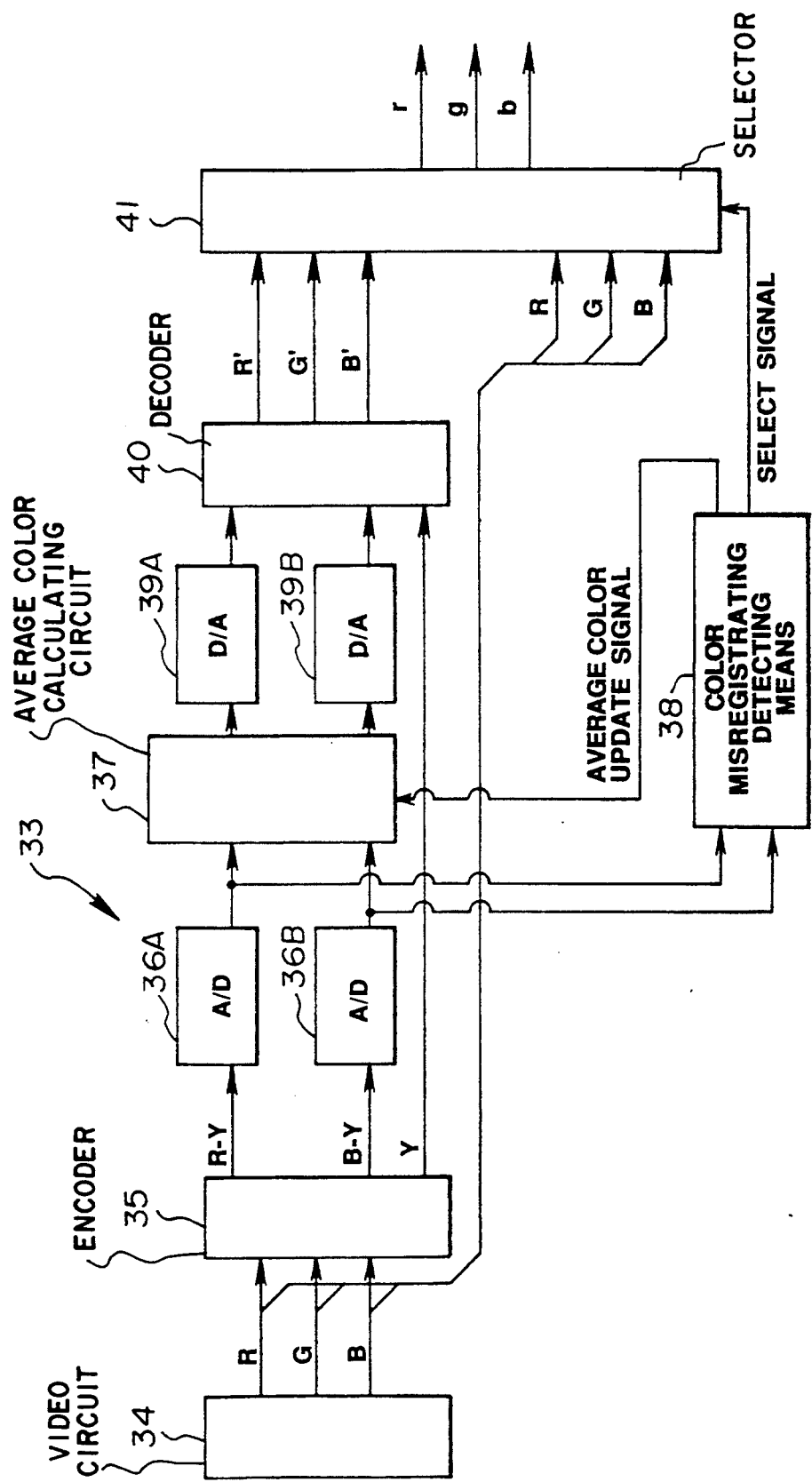
FIG. 1 is an overall block diagram of a color misregistration easing system according to the first embodiment.
Figure 2:
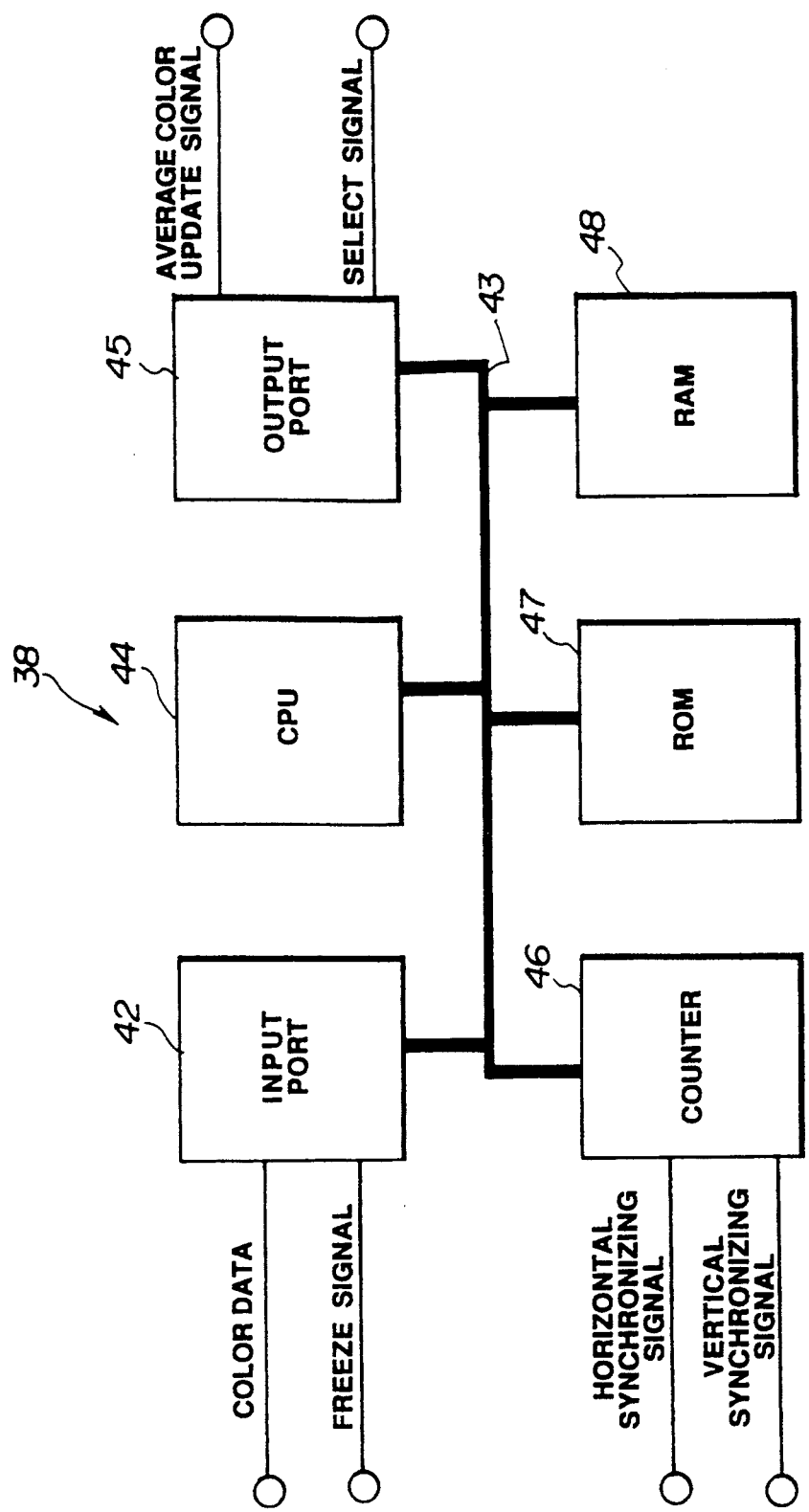
FIG. 2 is a block diagram showing a configuration of a color misregistration detecting means.
Figure 3:
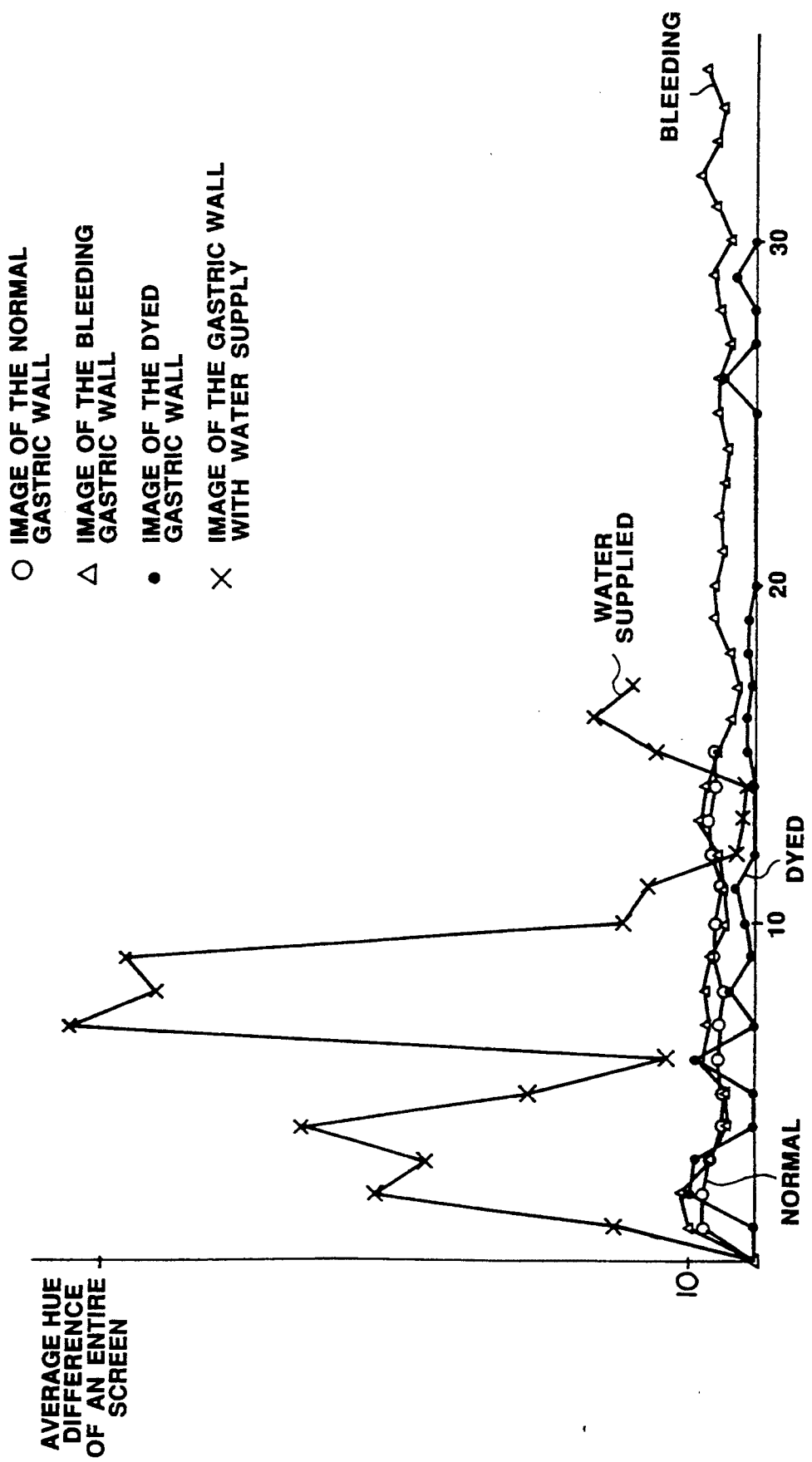
FIG. 3 is an explanatory diagram showing variations in average hue differences of image screens of clinical cases.
Figure 4:
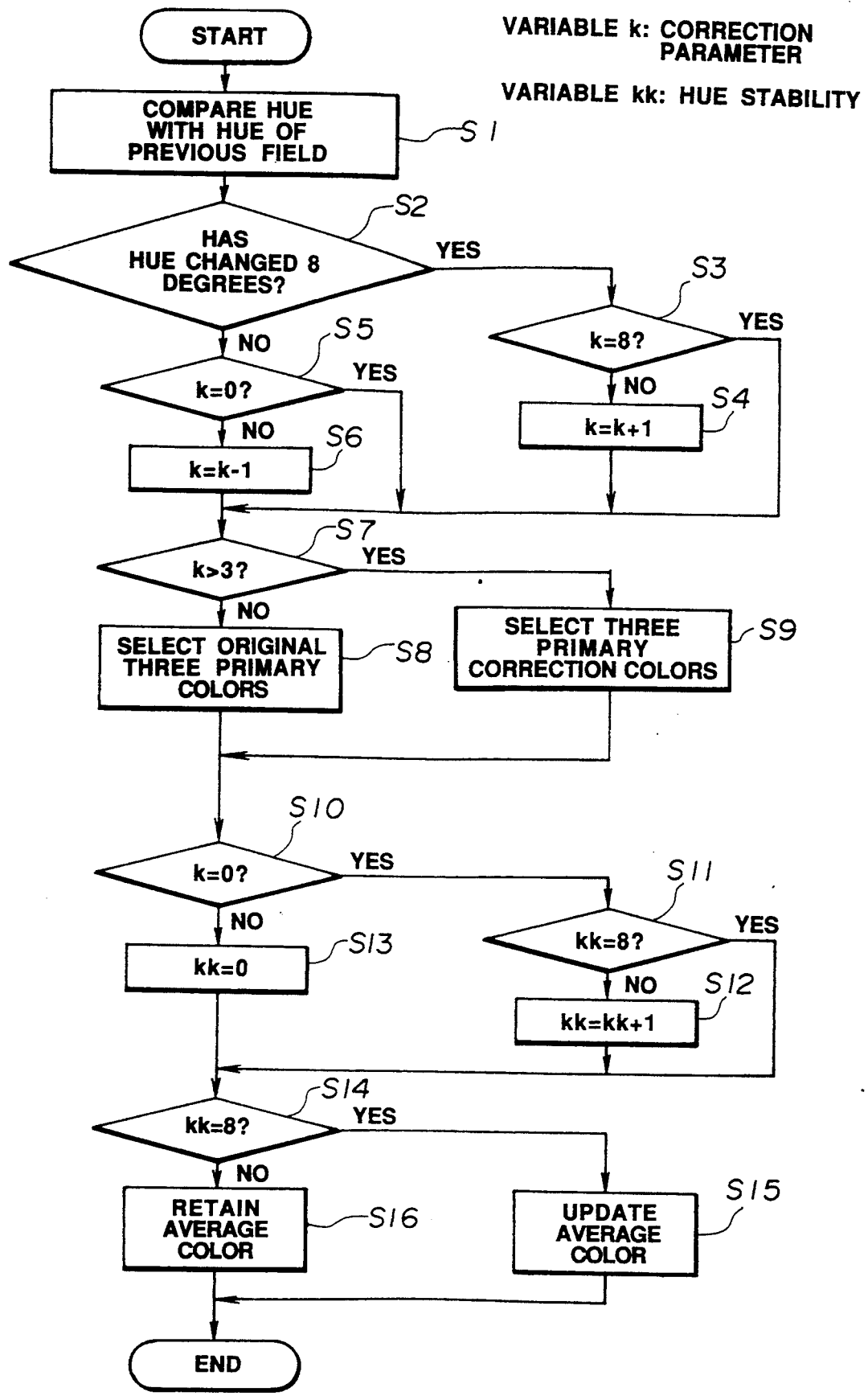
FIG. 4 is a flowchart showing operations of color signal selection and average color update.

FIGS. 1 to 4 relate to the first embodiment of the present invention. FIG. 1 is an overall block diagram of a color misregistration easing system. FIG. 2 is a block diagram showing a configuration of a color misregistration detecting means. FIG. 3 is an explanatory diagram showing variations in average hues of image screens of clinical cases. FIG. 4 is a flowchart showing operations of color signal selection and average color update.

FIG. 1 shows a color misregistration easing system 33 of the first embodiment. The color misregistration easing system 33 receives time-series signals from an electronic endoscope, which is not shown, or a field sequential type imaging means for carrying out color misregistration easing. The color misregistration easing system 33 includes a video circuit 34 for synchronizing the time-series signals of a subject the electronic endoscope has produced, converting the signals into standard signals; such as, three primary color signals R, G, and B, then outputting the converted signals.

The three primary color signals R, G, and B sent from the video circuit 34 are applied to one of the inputs of a selector 41 serving as a switching means. Three primary color correction signals R', G', and B' sent from a decoder to be described later are applied to the other input of the selector 41. The selector 41 is formed with, for example, a semiconducting video switch.

The three primary color signals R, G, and B are also supplied to an encoder 35. Then, a luminance signal Y and color difference signals R−Y and B−Y are generated. The luminance signal Y enters a decoder 40. The color difference signals R−Y and B−Y are converted into digital color difference signals by A/D converters 36A and 36B, then supplied to an average color calculating circuit 37 for providing an average color and to a color misregistration detecting means 38 serving as a detecting means.

The average color calculating circuit 37 integrates input color difference signals R−Y and B−Y to generate average color difference signals <R−Y> and <B−Y>. The average color difference signals <R−Y> and <B−Y> are converted into analog signals by D/A converters 39A and 39B, then supplied to the decoder 40. The decoder 40 inputs the signals <R−Y> and <B−Y> associated with an average hue, and a real-time luminance signal Y defining the luminance level. As a result, three primary color correction signals R', G', and B' are generated.

The color misregistration detecting means 38 generates a select signal according to the digital color difference signals R−Y and B−Y sent from the D/A converters 36A and 36B, then outputs the select signal to the selector 41. In response to the select signal, the selector 41 selects either three primary color signals R, G, and B sent from the video circuit 34 or three primary color correction signals R', G', and B' sent from the decoder 40. Thus, either the R, G, and B or the R', G', and B' are supplied to a display that is not shown. The color misregistration detecting means 38 outputs an average color update signal to the average color calculating circuit 37 according to the input signals. That is to say, only when a screen is regarded as normal with little color misregistration, the average color calculating circuit 37 updates an average color.

FIG. 2 is a block diagram of a color misregistration detecting means 38.

Color signals R−Y and B−Y, which are digitized by A/D converters 36A and 36B, are supplied as color data to an input port 42. A freeze signal sent from an endoscope system, which is not shown, also enters the input port 42. Therefore, when a still mode is designated, three original primary colors can be displayed promptly. The input port 42 is connected on a bus 43. Over the bus 43, data is transferred to a CPU 44. The bus 43 is also connected to an output port 45, a counter 46, a ROM 47, and a RAM 48. The output port 45 outputs an average color update signal and a select signal. These signals enter an average color calculating circuit 37 and a selector 41.

The counter 46 issues an interrupt to the CPU 44 over the bus 43 at regular intervals when a horizontal synchronizing signal and a vertical synchronizing signal are sent from the endoscope system that is not shown. With the interrupt, the CPU 44 executes a water supply detection program. The ROM 47 contains the water supply detection program the CPU 44 executes and reference data. The program and reference data are read by the CPU 44. The CPU 44 reads and writes variables of the program and hue histories from and in the RAM 48.

The operation of the color misregistration easing system 33 having the aforesaid configuration will be described with reference to the drawings.

Each of three primary color signals R, G, and B or color information can be decomposed into three components of luminance, hue, and saturation that are three color attributes (color information). When the gastric wall of a living body is viewed without a water supply, almost all the pixels have reddish hues, though their luminances and saturations vary. Therefore, an average hue of an entire screen remains quite stable throughout fields.

The average hue of an entire screen is a hue obtained by integrating respective color differences R−Y and B−Y of all pixels in one field, then transferring the results of the integration to polar coordinates on the color difference plane.

When methylene blue or other cyanic pigment is used as a dye, hues of pixels are almost red and cyan. The average hue of an entire screen remains nearly stable throughout the fields.

On the other hand, when an electronic endoscope executes a water supply, waterdrops (not shown) jetted by a water supply intersect the front of an object. Then, depending on the radiation timings of color transmission filters, the shape of a waterdrop, and the angle of falling light with respect to a waterdrop, the average hue of an entire screen varies drastically from field to field.

FIG. 3 shows variations in average hue differences of image screens produced in clinical practice. The average hue difference is a difference between average hues of fields. In an image of a normal gastric wall, an image of a bleeding gastric wall, or an image of a dyed gastric wall, the average hue difference of an entire screen seldom exceeds 10 degrees. On the other hand, in an image of a gastric wall during water supply, the average hue difference of an entire screen varies greatly and often becomes much higher than 10 degrees.

Based on the above facts, a color misregistration detecting means 38 outputs an average color update signal to an average color calculating circuit 37 field by field according to the flowchart of FIG. 4. The color misregistration detecting means 38 outputs a select signal to a selector 41. A counter 46 of the color misregistration detecting means 38 receives a horizontal synchronizing signal and a vertical synchronizing signal, identifies a predetermined image field, and restricts the duration in which a CPU 44 fetches data in fields via an input port 42.

When the duration of field-by-field reading terminates, the counter 46 issues an interrupt to the CPU 44. With the interrupt, the CPU 44 starts executing a program according to the flowchart shown in FIG. 4. The operations of the program will be described.

First, at a step S1, a CPU 44 uses integrated color difference components of one field to calculate an average hue of an entire screen, then calculates a difference of the average hue from an average hue of an entire screen of the preceding field, and thus compares the average hue from an average hue of an entire screen of the preceding field. As a result, if it is found at a step S2 that the hue has changed 8 or more degrees, the CPU 44 determines it is highly probable that color misregistration due to water supply has occurred. After passing through a step S3 to a step S4, the CPU 44 increments a correction parameter k. However, the value of the correction parameter k shall not exceed 8 as confirmed at the step S3. When the hue difference is less than 8 degrees, the CPU 44 decrements the correction parameter k after passing through a step S5 to a step S6. However, the value of the correction parameter k shall not be smaller than 0.

Then, at a step S7, the CPU 44 determines whether the correction parameter k exceeds 3. When the correction parameter k is 3 or less, a selector 41 is instructed to output three original primary colors at a step S8. When the correction parameter k ranges from 4 to 8, the CPU 44 instructs the selector 41 to output three correction primary colors at a step S9. However, the initial value of the correction parameter k shall be set to 0 by a main program.

Next, at a step S10, it is determined whether the value of the correction parameter k is 0. When the correction parameter k is not 0, control passes through a step S11 to a step S12. Then, a hue stability kk is incremented. However, the value of the hue stability kk shall not exceed 8 as confirmed at the step S11.

Unless the correction parameter k is 0, the hue stability kk is cleared to zero at a step S13. Then, at a step S14, it is checked if the hue stability kk is 8. If the hue stability kk is 8, the CPU 44 determines at a step S15 that the hue is quite stable, then validates an average color update signal to update an average color. On the other hand, if the hue stability kk is not 8, at a step S14, the CPU 44 invalidates the average color update signal so that the average color will not be updated but held intact.

When a freeze signal enters an input port 42, an original color image is selected as an output of a selector 41 unconditionally. Thus, the program is described. This selection is done with a select signal sent from an output port 45. Thereby, when an operator needs a still image, an original color image appears promptly.

In the system of the first embodiment, when severe color misregistration occurs because of water supply, a color misregistration detecting means 38 detects a varying hue of the entire screen. An input of a selector 41 or a display indicates that severe color misregistration due to water supply has occurred. Then, a correction color image free from color misregistration appears. Therefore, an operator can refrain from viewing a rainbow-colored image or other hard-to-see image during water supply, and thus will not suffer eyes fatigue.

In the system of the first embodiment, a correction parameter k is employed. This prevents frequent switching between an original image and a correction image which affects image display adversely. A feeling of unnaturalness attributable to the fact that an average color of an image containing intense color misregistration due to water supply has been adopted as a correction color will not be given to an operator by invalidating an average color update signal. Thus, a correction color is always stable.

Various constants used in the flowchart shown in FIG. 4 of the first embodiment can be optimized by analyzing clinical image data.

The color misregistration detecting means 38 may be formed with dedicated hardware instead of a CPU and software.

Figure 5:
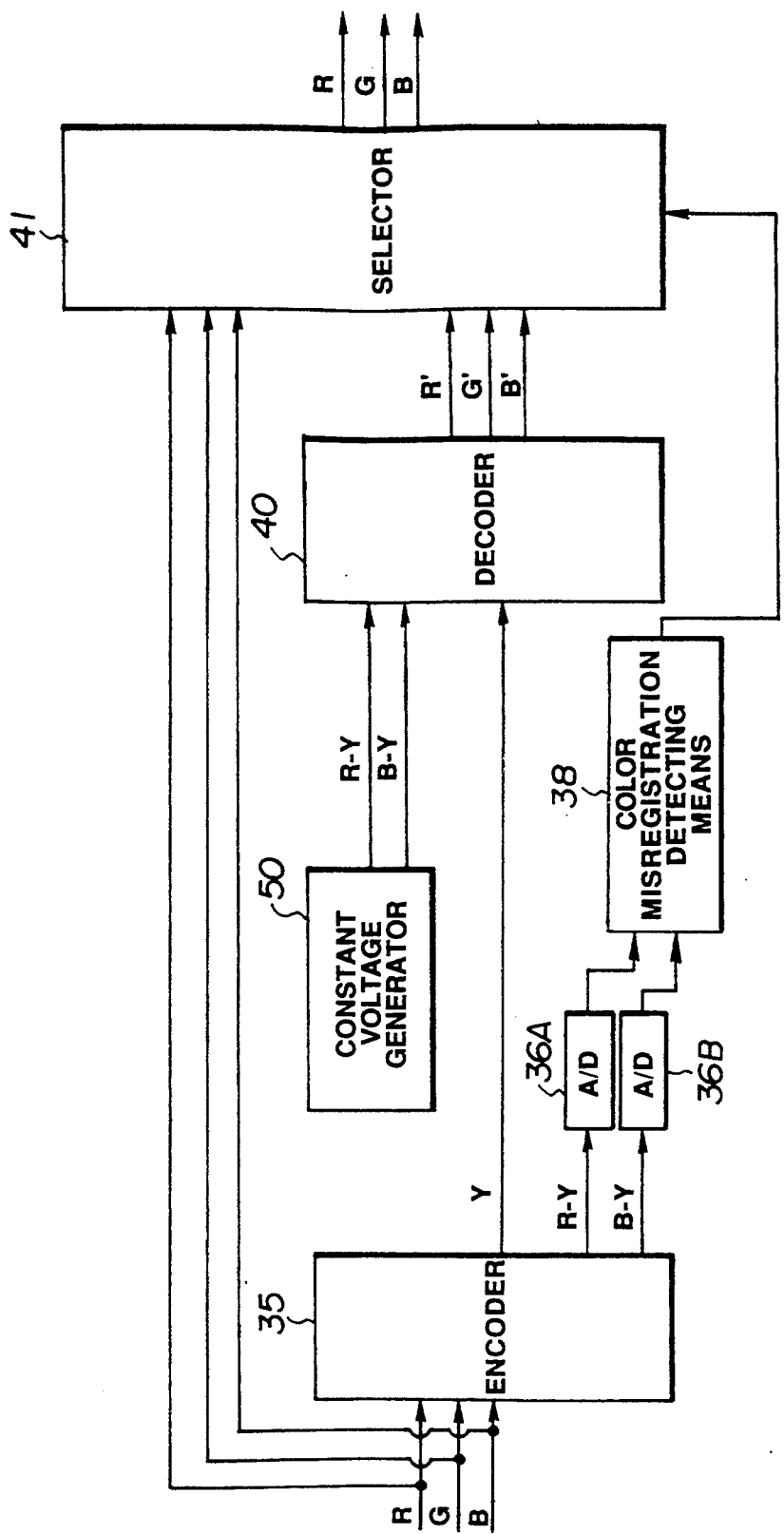
FIG. 5 is an overall block diagram of a color misregistration easing system according to the second embodiment.

FIG. 5 is an overall block diagram of a color misregistration easing system according to the second embodiment of the present invention.

A color misregistration easing system of the first embodiment uses average color differences to generate three primary color correction signals. In this embodiment, color differences having set values are used to generate three primary correction signals. Other components identical to those of the first embodiment are assigned the same numerals. The components and the operation identical to that of the first embodiment will not be described.

A color misregistration easing system shown in FIG. 5 receives three primary color signals R, G, and B from a video circuit 34 installed in an electronic endoscope or a camera control unit that is not shown. The color misregistration easing system 49 has a constant voltage generator 50 for outputting color difference signals R−Y and B−Y that are set to given values. The constant voltage generator 50 outputs the color difference signals R−Y and B−Y to a decoder 40. The decoder 40 synthesizes the color difference signals R−Y and B−Y of given values with a luminance signal sent from an encoder 35 to generate three primary color correction signals.

Endoscopic images have, in general, a red tone. The color difference values outputted by the constant voltage generator 50 are fixed so that the chromaticity of a red tone of a subject can be reproduced.

The system of this embodiment can correct intense color misregistration to reproduce a red tone of a subject. The other components, operation, and advantages are identical to those of the first embodiment. The description will be omitted.

Figure 6:
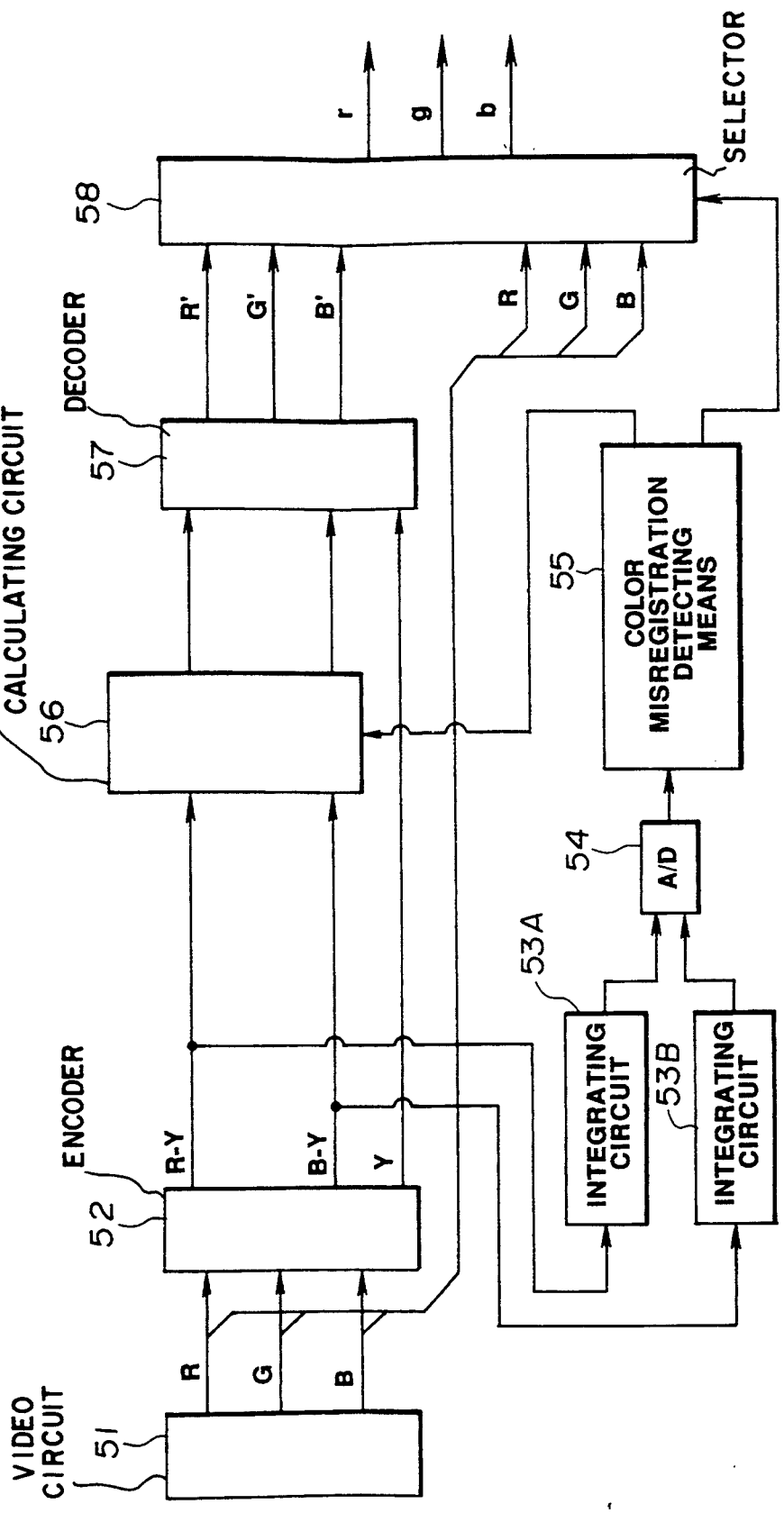
FIG. 6 is an overall block diagram of a color misregistration easing system according to the third embodiment.
Figure 7:
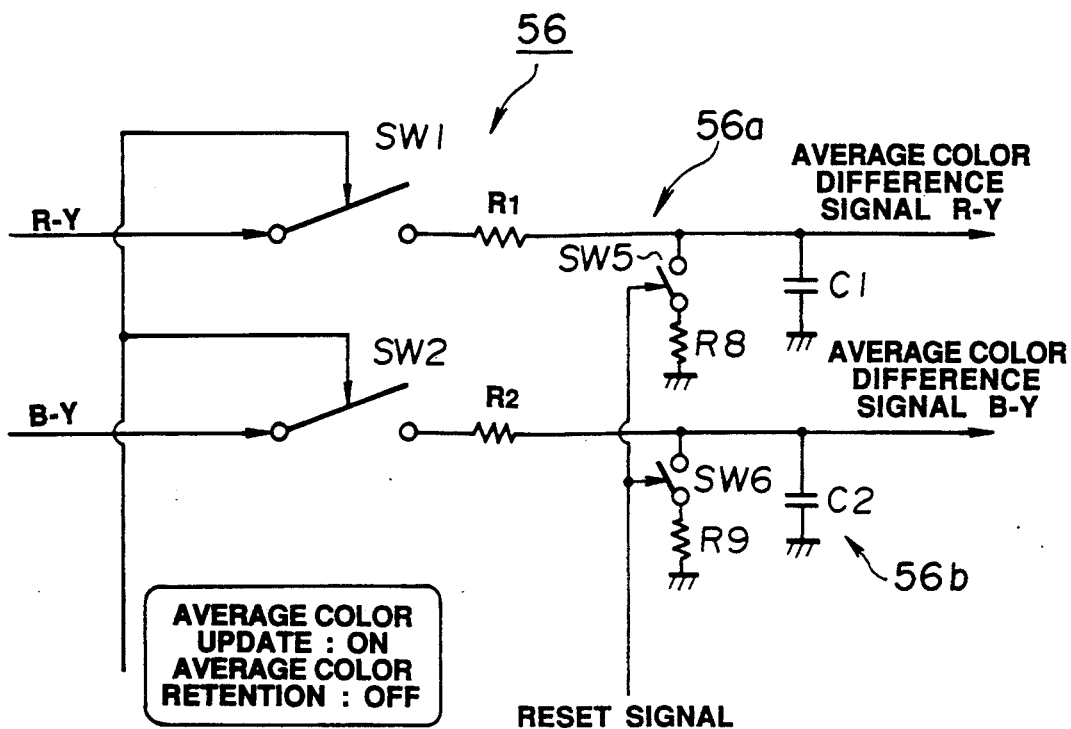
FIG. 7 is a circuit diagram showing an example of an average color calculating circuit.
Figure 8:
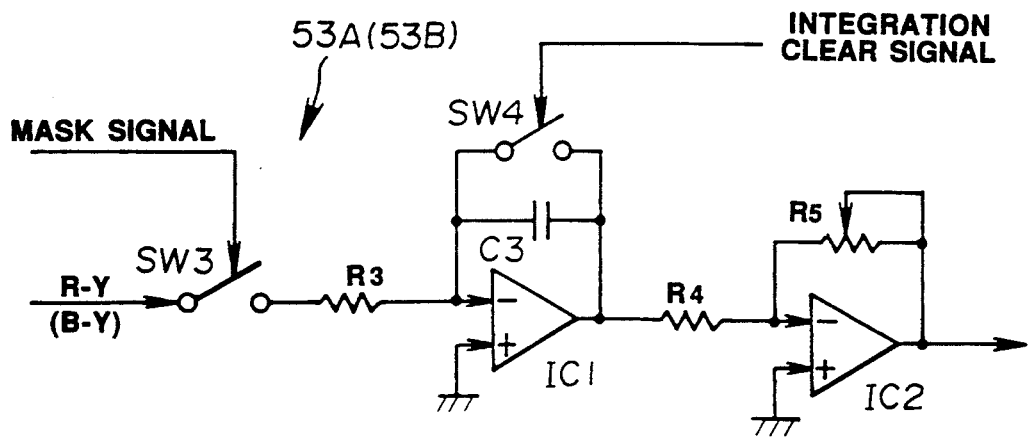
FIG. 8 is a circuit diagram showing an example of a color difference component integrating circuit.
Figure 10:
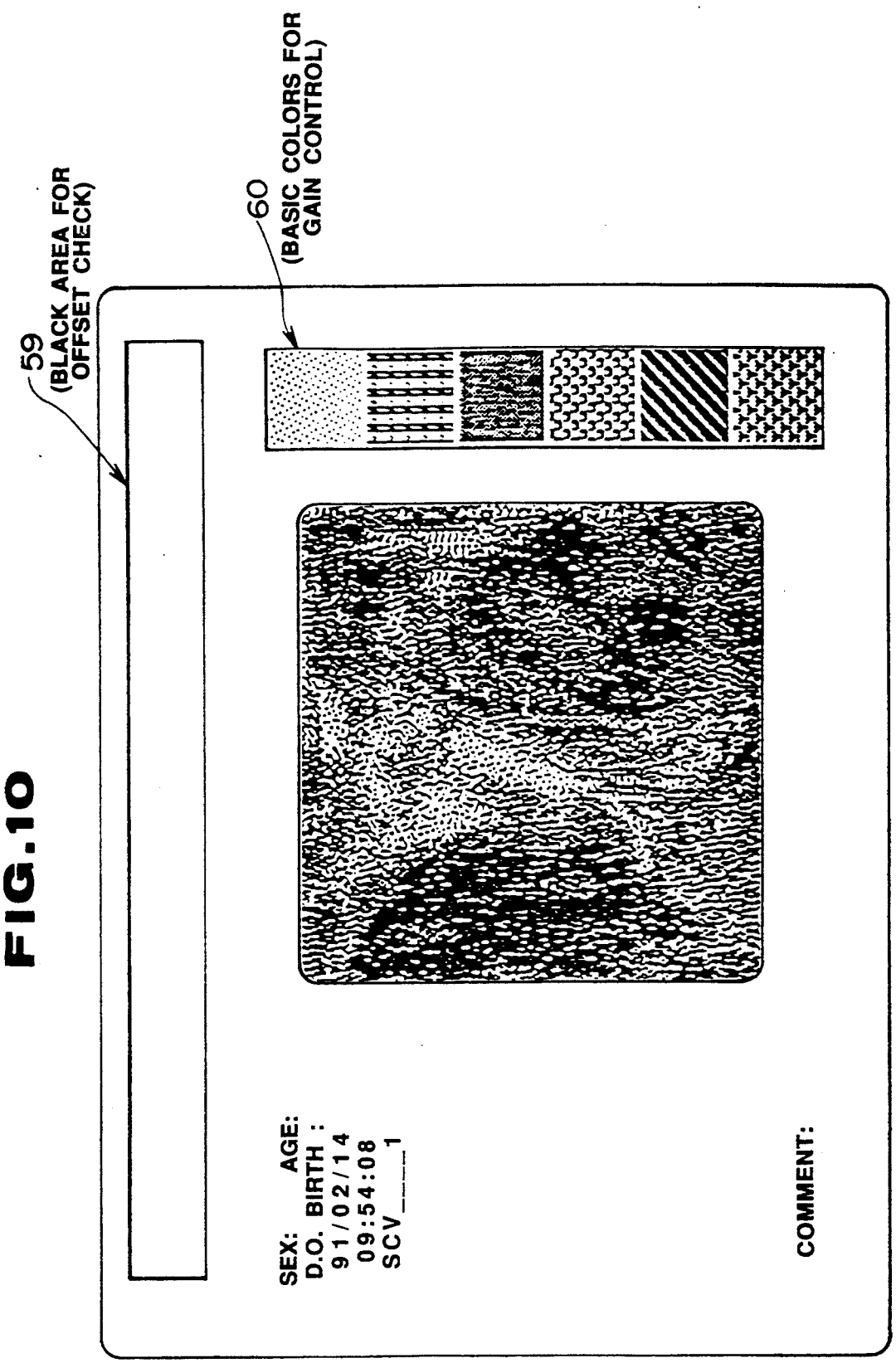
FIG. 10 is an explanatory diagram showing an example of a screen configuration.
Figure 11:
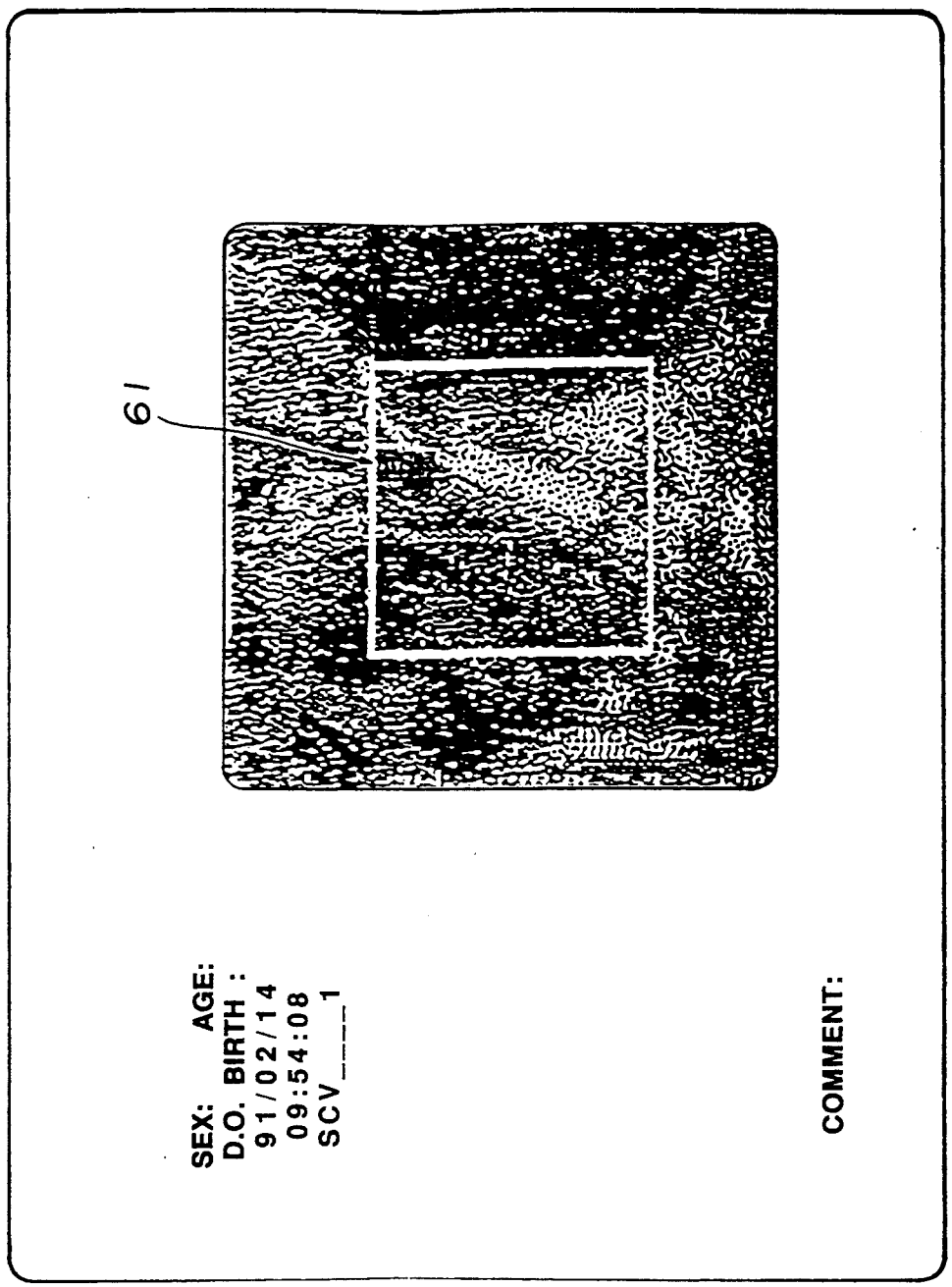
FIG. 11 is a screen layout for explaining color misregistration correction with a limited detection area.

FIGS. 6 to 11 relate to the third embodiment of the present invention. FIG. 6 is an overall block diagram of a color misregistration easing system. FIG. 7 is a circuit diagram showing an example of an average color calculating circuit. FIG. 8 is a circuit diagram showing an example of a color difference component integrating circuit. FIGS. 9(a) and (b) are timing charts of signals employed for the color difference component integrating circuit shown in FIG. 8. FIG. 10 is an explanatory diagram showing an example of a screen layout. FIG. 11 shows a screen layout for explaining color misregistration correction with a limited detection field.

As shown in FIG. 6, three primary color signals R, G, and B a video circuit 51 outputs are applied to one of the inputs of a selector 58. Three primary color correction signals R', G', and B' a decoder 5 outputs are applied to the other input of the selector 58.

The video circuit 51 inputs, similarly to a vide circuit 34 of the first embodiment, signals originating from a field sequential imaging means, synchronizes the signals, then outputs three primary color signals R', G', and B'. The selector 58 is formed with, for example, a semiconducting video switch.

The three primary color signals R, G, and B are supplied to an encoder 52. Then, a luminance signal Y and color difference signals R−Y and B−Y are generated. The luminance signal Y enters a decoder 57. The color difference signals R−Y and B−Y are integrated by color difference component integrating circuits 53A and 53B, converted into digital color difference signals by an A/D converter 54, then supplied to a color misregistration detecting means 55. The encoder 52 outputs the color difference signals R−Y and B−Y to an average color calculating circuit 56 for calculating an average color.

In the average color calculating circuit 56 shown in FIG. 7, input color difference signals R−Y and B−Y are applied to terminals of mutually-interlocked switches SW1 and SW2. The other terminals of the switches SW1 and SW2 are connected to low-pass filters 56a and 56b made up of resistors R1 and R2, and capacitors C1 and C2, respectively. For the low-pass filters 56a and 56b, time constants are specified so that voltages associated with averages of color difference signals R−Y and B−Y for one screen will be held in the capacitors C1 and C2. Then, the low-pass filters 56a and 56b are charged when the switches SW1 and SW2 are on, thus providing average color difference signals <R−Y> and <B−Y>. The average color difference signals <R−Y> and <B−Y> are supplied to the decoder 57. That is to say, the decoder 57 inputs signals <R−Y> and <B−Y> representing average color differences and a real-time luminance signal Y defining the luminance level, and generates three primary color correction signals R', G', and B'.

A series circuit made up of a switch SW5 and a resistor R8 is connected in parallel with the capacitor C1. A series circuit made up of a switch SW6 and a resistor R9 is connected in parallel with the capacitor C2. The switches SW5 and SW6 are interlocked. With a reset signal sent immediately before output of an average color update signal (validated), the switches SW5 and SW6 are turned on. With the switches SW5 and SW6 on, the capacitors C1 and C2 are discharged. Then, average color differences are reset to zeros.

The select signal the color misregistration detecting means 55 outputs is supplied to a selector 58. Thus, either three primary color signals R, G, and B or three primary color correction signals R', G', and B' selectively appear on a display that is not shown.

The average color update signal the color misregistration detecting means 55 outputs enters the average color calculating circuit 56. Only when a screen is recognized as normal, an average color is updated.

FIG. 8 shows an example of a color difference component integrating circuit 53A.

A color difference signal R−Y sent from an encoder 52 enters one of the terminals of a switch SW3. The other terminal of the switch SW3 is connected to an integration operational amplifier IC1 via a resistor R3. A parallel circuit made up of a capacitor C3 and a switch SW4 is connected between the inverse input terminal and output terminal of the integration operational amplifier IC1 whose non-inverse input terminal is grounded. When the switch SW4 is off, charges are stored in the capacitor C3. When the switch SW4 is on, the capacitor C3 is discharged.

The output terminal of the integration operational amplifier IC1 is connected to the inverse input terminal of an amplification inverse operational amplifier IC2. A trimmer resistor R5 is connected between the inverse input terminal and output terminal of the amplification inverse operational amplifier IC2. The output signal of the amplification inverse operational amplifier IC2 is supplied to an A/D converter 54.

In response to a mask signal a video circuit 51 outputs, the switch SW3 is turned on or off. When the mask signal is high, an endoscopic image appears on a display. Therefore, the switch SW3 is turned on, and color difference components are integrated.

A signal generator, which is not shown, outputs an integration clear signal to the switch SW4 cyclically. When the clear signal is high, the switch SW4 is on. Then, charges stored in the capacitor C3 and associated with integrated color difference components are released completely. The clear signal may be generated, for example, every other line as shown in FIG. 9a, every two lines as shown in FIG. 9b, or in units of multiple lines or fields. However, the A/D converter 54 shall sample signals immediately before the clear signal is driven high.

On the other hand, a color difference component integrating circuit 53B has the same circuitry as a color difference component integrating circuit 53A.

The specific circuits of the color misregistration detecting means 55 are identical to those in the first embodiment. The description will be omitted.

The operation of the third embodiment having the aforesaid configuration is almost the same as that of the first embodiment. However, the system of this embodiment employs an analog circuit as an average color calculating circuit 56. Therefore, the process of generating an average color can be realized with a simple circuitry. In this system, a color misregistration detecting means 55 is preceded by integrating circuits 53A and 53B. Thereby, the color misregistration detecting means 55 fetches color data in moderate cycles. This is a difference from the system of the first embodiment.

The timings of two control signals, a mask signal, and a clear signal supplied to the integrating circuits 53A and 53B will be described with reference to FIGS. 9(a) and (b).

In the timing chart of FIG. 9(a), the color misregistration detecting means 55 fetches color data in cycles of one line. When the mask signal is low or when an endoscopic image is not displayed, the clear signal is generated. When the mask and clear signals are low, the color misregistration detecting means 55 fetches integration data. With input of a vertical synchronizing signal, the same processing as that performed in the first embodiment is carried out according to the total value of integration data of all lines.

In the timing chart of FIG. 9(b), the color misregistration detecting means 55 fetches color data in cycles of two lines.

The average color calculating circuit 56 is formed with resistors, capacitors, and switches as shown in FIG. 7, thus having a low-cost and simple circuitry. Since the color misregistration detecting means 55 is preceded by the integrating circuits 53A and 53B, the color misregistration detecting means 55 can find time to fetch color data. Thereby, the operations of semiconducting components making up the color misregistration detecting means 55 can be slowed down. Therefore, lower-cost components with lower operation assurance speeds can be employed to form the color misregistration detecting means 55.

The trimmer resistor R5 adjusts irregular average color differences resulting from a varying offset of an A/D converter, or variations in resistance of resistors R3 and R4 and in capacitance of a capacitor C3 that are used for calculating average color differences.

In the third embodiment, the trimmer resistor R5 shown in FIG. 8 must be adjusted finely. However, when a screen layout shown in FIG. 10 is adopted, the trimmer may be adjusted roughly. In FIG. 10, an area indicated with a numeral 59 represents a black area. Color differences of this area are integrated and digitized. Thereby, an offset of an A/D converter can be checked. Multiple basic colors appear in an area indicated with a numeral 70. The color differences of each of the color areas are integrated, digitized, then fetched. Thereby, gains for the axes of color difference coordinates can be controlled finely using software.

In the third embodiment, all color difference data for a period of displaying an endoscopic image are calculated. As shown in FIG. 11, a detection area 61 may be set. Then, only the color difference data of the area may be calculated to detect water supply. This is effective when an operator's (observer's) view point resides in the center of an image area. In general, an observer's view point often lies in the center of an image area.

Figure 12:
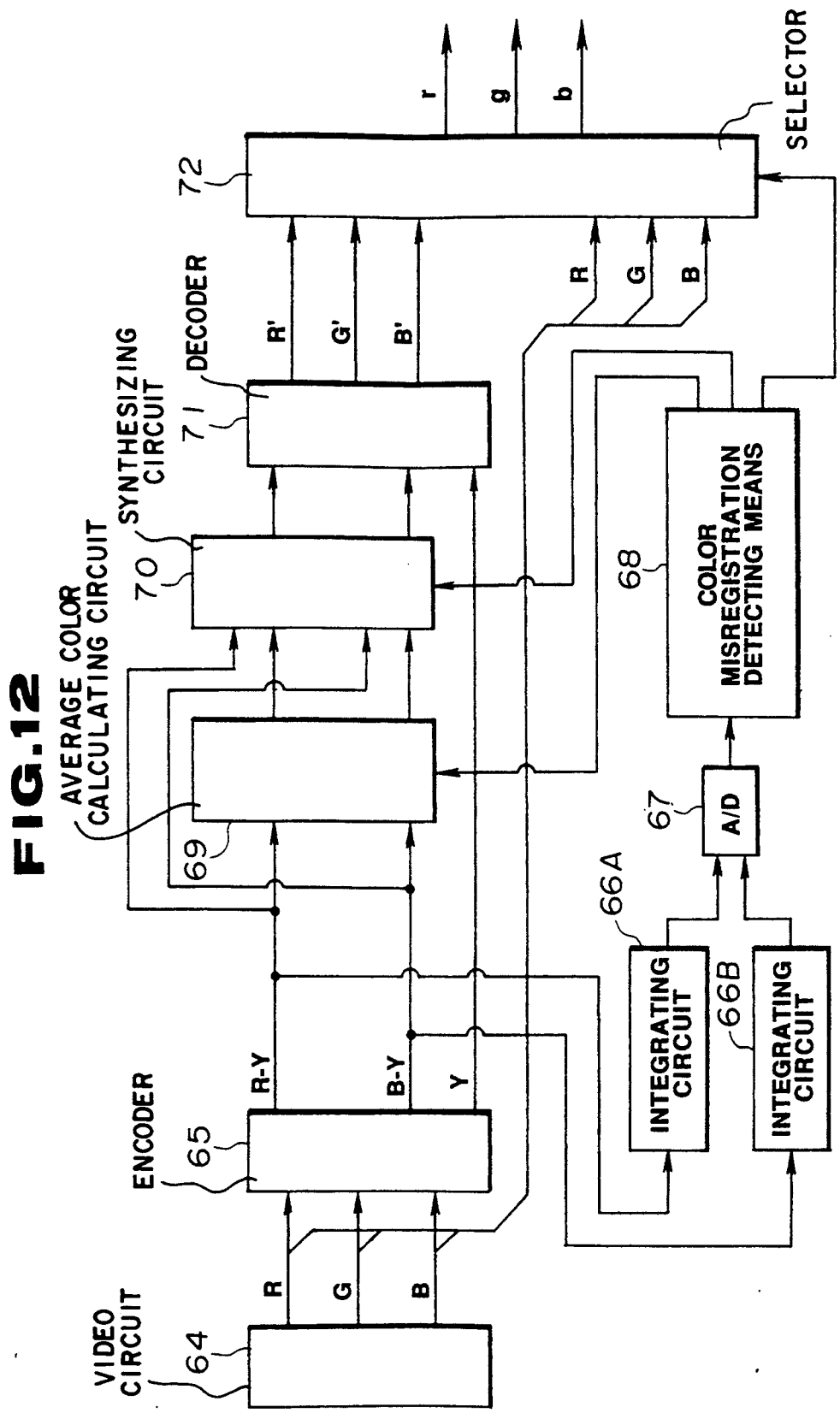
FIG. 12 is an overall block diagram of a color misregistration easing system according to the fourth embodiment.
Figure 13:
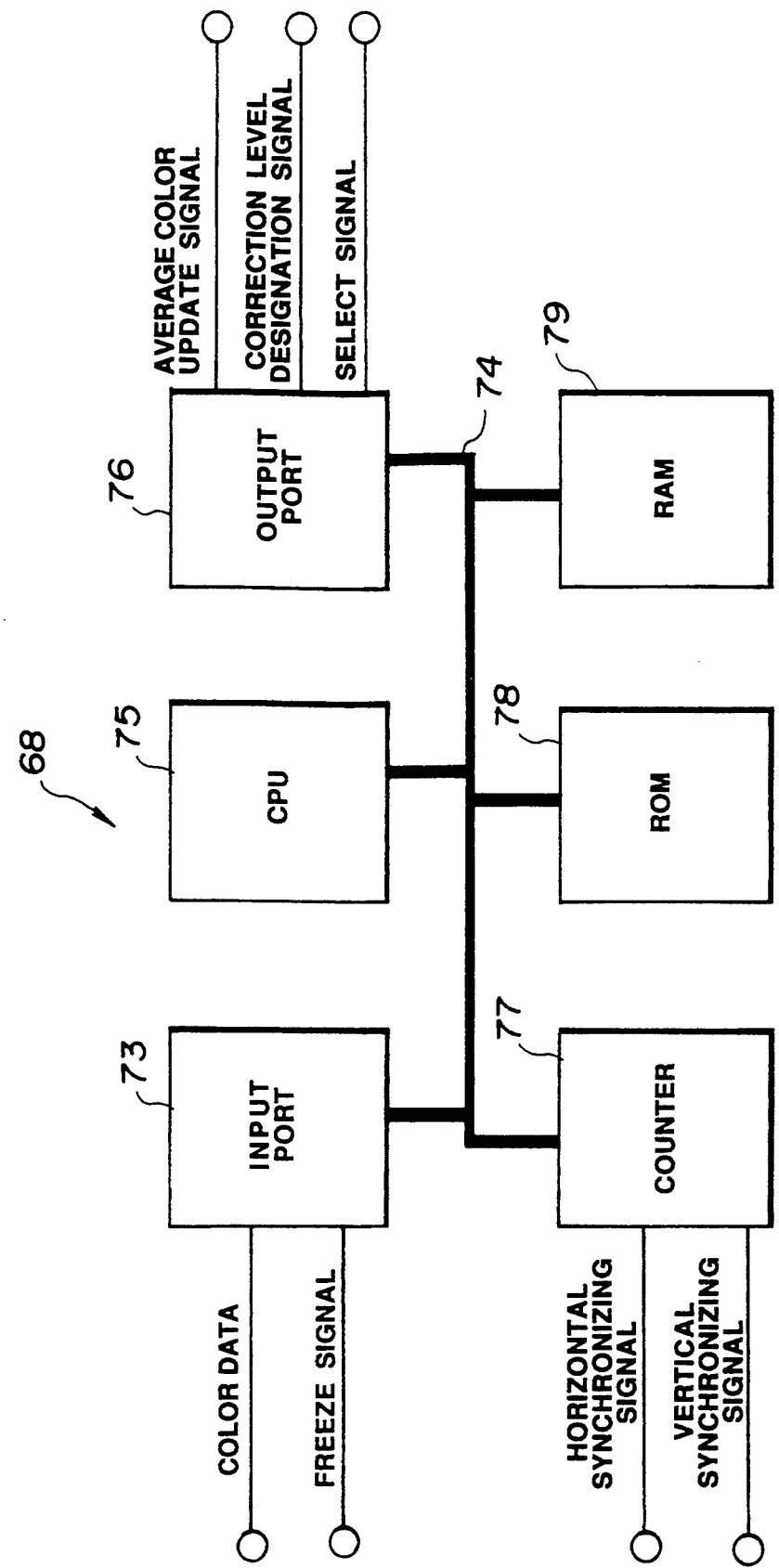
FIG. 13 is a block diagram showing a configuration of a color misregistration detecting means.
Figure 14:
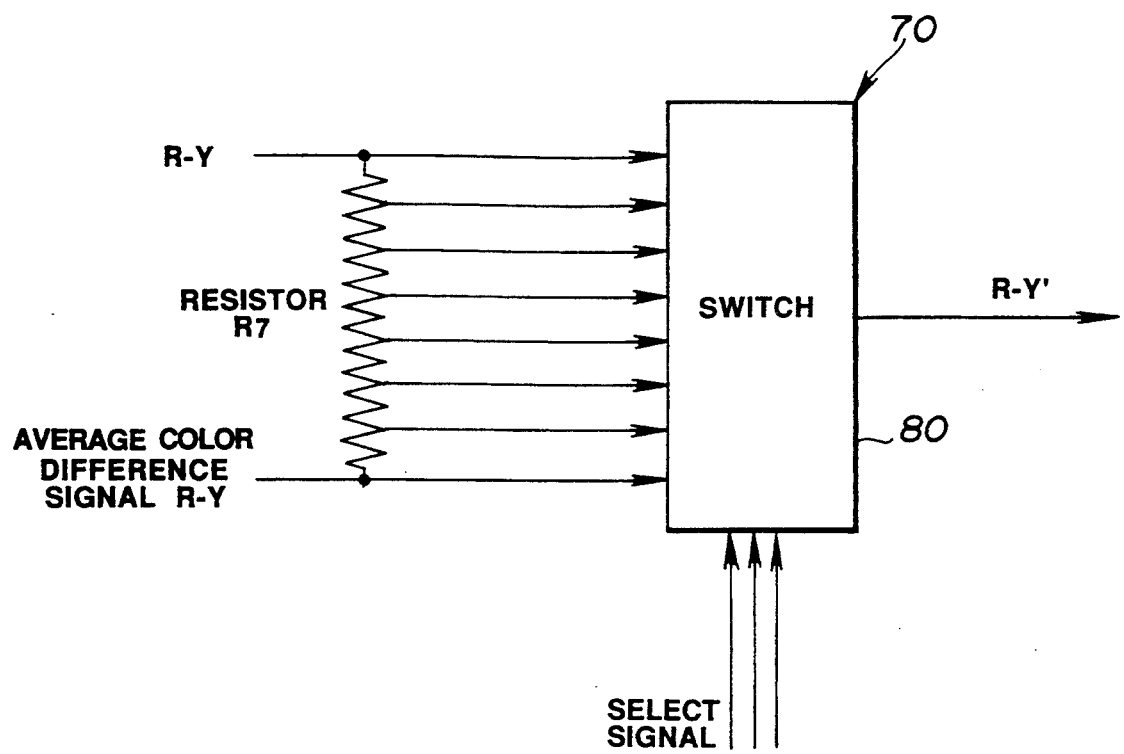
FIG. 14 is a configuration diagram showing an example of a synthesizing circuit.
Figure 16:
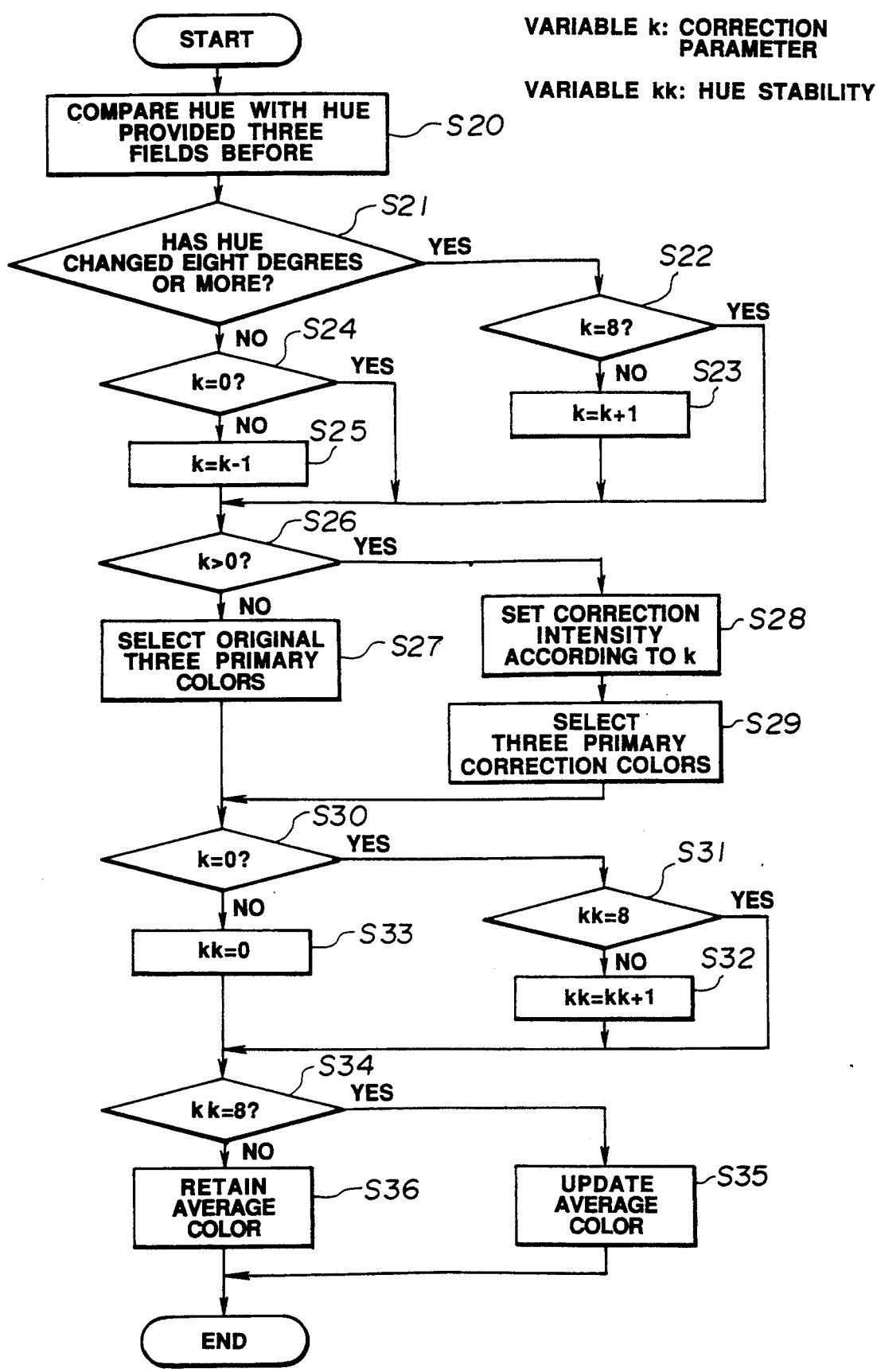
FIG. 16 is a flowchart showing operations of average color update and correction level setting.

FIGS. 12 to 18 relate to the fourth embodiment of the present invention. FIG. 12 is an overall block diagram of a color misregistration easing system. FIG. 13 is a block diagram showing a configuration of a color detecting means. FIG. 14 is a configuration diagram showing an example of a synthesizing circuit. FIG. 15 is an explanatory diagram showing hue table conversion using an ROM. FIG. 16 is a flowchart showing operations of average color update and correction level setting. FIG. 18 is a block diagram showing a variant of a color misregistration easing system.

As shown in FIG. 12, three primary color signals R, G, and B a video circuit 64 outputs are applied to one of the input terminals of a selector 72. Three primary color correction signals R', G', and B' a decoder 71 outputs are applied to the other terminal of the selector 72. A video circuit 64 inputs, similarly to a video circuit 34 of the first embodiment, signals originating from a field sequential type imaging means, synchronizes the signals, then outputs three primary color signals R', G', and B'. The selector 72 is formed with, for example, a semiconducting video switch.

The three primary color signals R, G, and B are supplied to an encoder 65, too. Then, a luminance signal Y and color difference signals R−Y and B−Y are generated. The luminance signal Y enters a decoder 71. The color difference signals R−Y and B−Y are integrated by color difference component integrating circuits 66A and 66B, converted into digital color difference signals by an A/D converter 67, then supplied to a color misregistration detecting means 68. The color difference signals R−Y and B−Y are supplied to an average color calculating circuit 69 and to a synthesizing circuit 70.

The average color calculating circuit 69 integrates input color difference signals R−Y and B−Y to generate average color difference signals <R−Y> and <B−Y>, then, outputs the average color difference signals <R−Y> and <B−Y> to the synthesizing circuit 70. The synthesizing circuit 70 inputs the real-time color difference signals R−Y and B−Y, and the average color difference signals <R−Y> and <B−Y>, synthesizes the color difference signals R−Y and B−Y, and <R−Y> and <B−Y> at a ratio specified with a correction level designation signal sent from a color misregistration detecting means 68, and thus generates synthesized color difference signals [R−Y] and [B−Y]. The synthesized color difference signals [R−Y] and [B−Y] are supplied to the decoder 71. The decoder 71 inputs the synthesized color difference signals [R−Y] and [B−Y] as well as a real-time luminance signal Y defining the luminance level, and thus generates three primary color correction signals R', G', and B'.

A select signal the color misregistration detecting means 68 outputs enters the selector 72. In response to the select signal, the selector 72 selects either three primary color signals R, G, and B or three primary color correction signals R', G', and B' so that the selected signals will appear on a display that is not shown.

An update signal the color misregistration detecting means 68 outputs is supplied to the average color calculating circuit 69. Only when a screen is recognized as normal, an average color is updated. The color misregistration detecting means 68 also outputs the correction level designation signal to the synthesizing circuit 70.

FIG. 13 shows an example of a configuration of a color misregistration detecting circuit 68.

Color signals R−Y and B−Y, which are digitized, are supplied as color data to an input port 73. The input port 73 also receives a freeze signal from an endoscope system that is not shown. When a still mode is designated, original three primary colors are supplied promptly. The input port 73 is connected on a bus 74. Over the bus 74, data is transferred to a CPU 75. The bus 74 is also connected to an output port 76, a counter 77, a ROM 78, and a RAM 79.

An average color update signal, a correction level designation signal, and a select signal are sent via the output port 76. These signals enter an average color calculating circuit 69, a synthesizing circuit 70, and a selector 72.

When a horizontal synchronizing signal and a vertical synchronizing signal are sent from the endoscope system, the counter 77 issues an interrupt to the CPU 75 over the bus 74 at regular intervals. With the interrupt, the CPU 75 executes a water supply detection program. An interrupt command from the counter 77 is sent to the CPU 75 over the bus 74. The ROM 78 contains the water supply detection program to be executed by the CPU 75 and reference data. The program and data are read by the CPU 75. Variables of the program and hue histories are read and written from and in the RAM 79 by the CPU 75.

FIG. 14 shows an example of a configuration of a synthesizing circuit 70.

FIG. 14 shows half the synthesizing circuit 70 or an example of a circuit for processing an R−Y signal. Signal lines for transmitting a real-time color difference signal R−Y and an average color difference signal <R−> are connected to the input terminals of a switch 80. A resistor R7 is connected in parallel with the signal lines and between the signal lines. The resistor R7 is divided into seven portions. Six contacts between pairs of adjacent portions are connected to six input terminals of the switch 80. That is to say, the switch 80 receives the real-time color difference signal R−Y, average color difference signal <R−Y>, and six signals each having divided voltages or intermediate voltages of the two signal voltages.

The switch 80 outputs any of the above eight input signals according to a correction level designation signal sent from the color misregistration detecting means 68 that is supplied as a select signal. More particularly, when the the correction level is higher, a value close to the average color difference signal <R−Y> is supplied. When the correction level is lower, a value close to the real-time color difference signal R−Y is supplied. A similar circuit is installed to process a color difference signal B−Y.

FIGS. 15(a), (b) and (c) explain the contents of a ROM 78. As shown in FIG. 15(a), the ROM 78 contains a program for detecting water supply and a hue conversion table the program references. In the hue conversion table, hue data associated with color difference data is retrieved from an address specified with an input of the color difference data. Assuming that the output data is represented with, for example, eight bits, the value ranges from 0 to 255, as shown in FIG. 15(b). As shown in FIG. 15(c), successive hues arranged radially from 0° to 360° in a color coordinate space are represented with integers ranging from 0 to 255, or discrete values.

The operations of the fourth embodiment having the aforesaid configuration will be described below.

A color misregistration detecting means 68 outputs an average color update signal to an average color calculating circuit 69, a select signal to a selector 72, and a correction level designation signal to a synthesizing circuit 70 field by field according to the flowchart of FIG. 16.

A counter 77 of the color misregistration detecting means 68 receives a horizontal synchronizing signal and a vertical synchronizing signal, identifies a predetermined image area, and restricts a duration in which a CPU 75 fetches color difference data via an input port 73. When the reading duration for the field terminates, the counter 77 issues an interrupt to the CPU 75. With the interrupt, the CPU 75 starts executing a program according to the flowchart shown in FIG. 16. The operations of the program will be described below.

First, at a step S20, a CPU 75 calculates an average hue of an entire screen using color difference components integrated for one field, and works out a difference of the calculated average hue from an average hue of an entire screen of three fields before. At a step S21, the CPU 75 checks if the hue has changed eight or more degrees. Then, after passing through a step S22, the CPU 75 determines it is highly probable that color misregistration due to water supply has occurred. At a step S23, the correction parameter k is incremented. However, the correction parameter k shall not exceed 8 as confirmed at the step S22.

When the hue difference is less than 8, control passes through the step S21 to a step S24. At a step S25, the correction parameter k is decremented. However, the correction parameter k shall not be smaller than 8 as confirmed at the step S24.

As a result, if the correction parameter k is found to be 0 at a step S26, the CPU 75 selects original three colors as an output of a selector 72 at a step S27.

When the parameter k ranges from 1 to 8, the CPU 75 sets a correction level designation signal to a value associated with the value of the correction parameter k at a step S28. Thus, the correction level designation signal associated with the parameter k is sent to a synthesizing circuit 70 via an output port 76. Then, at a step S29, three primary color correction signals R', G', and B' a decoder 71 provides are selected as an output of the selector 72. The three primary color correction signals R', G', and B' are made up from synthetic color difference signals synthesized at different synthetic ratios based on the parameter k and an original luminance signal.

However, an initial value of the correction parameter k is set to zero by a main program.

Next, if the correction parameter k is found to be 0 at a step S30, control passes through S31. Then, at a step S32, a hue stability kk is incremented. However, the hue stability kk shall not exceed 8 as confirmed at the step S31. If the correction parameter k is found not to be 0 at the step S30, the hue stability kk is reset to 0 at a step S33.

As a result, if the hue stability kk is found to equal to 8 at a step S34, the CPU 75 determines that the hue is quite stable. Then, at a step S35, the CPU 75 validates an average color update signal for updating an average color.

On the other hand, when the hue stability kk is not 8, the CPU 75 invalidates the average color update signal so that the average color will not be updated but held intact.

When a freeze signal enters an input port 73, an original color image is selected as an output of the selector 72 unconditionally. Thus, the program is described. Selecting the original color image is achieved with a select signal the CPU 75 outputs via an output port 76. Thereby, when an operator needs a still image, an original color image is displayed promptly.

According to the system of the fourth embodiment, when a great variation in the hue of an entire screen is detected, occurrence of color misregistration due to water supply is determined. Then, a correction color image free from color misregistration is displayed. Therefore, an operator can refrain from looking at a rainbow-colored image or other hard-to-see image while carrying out water supply.

A correction parameter k is adopted. This prevents frequent switching between an original image and a correction image which adversely affects image display. In the system of this embodiment, since an average color update signal is used, an average color of an image containing intense color misregistration due to water supply will not be adopted as a correction color. Therefore, an operator will not have a feeling of unnaturalness. The correction color is always optimal and stable.

This embodiment synthesizes real-time color difference signals with average color difference signals at synthetic ratios based on a correction parameter k. Therefore, a normal mode and a correction mode are switched smoothly. This helps minimize the load on an operator's eyes.

In the fourth embodiment, various constants shown in FIG. 16 can be optimized by analyzing clinical image data.

The correction parameter k is incremented or decremented. Herein, when a hue has changed five degrees or less, the correction parameter k may be decremented. Then, the system may be insensible to a hue change of six or seven degrees. This will suppress frequent variation of the correction parameter k.

Figure 17A:
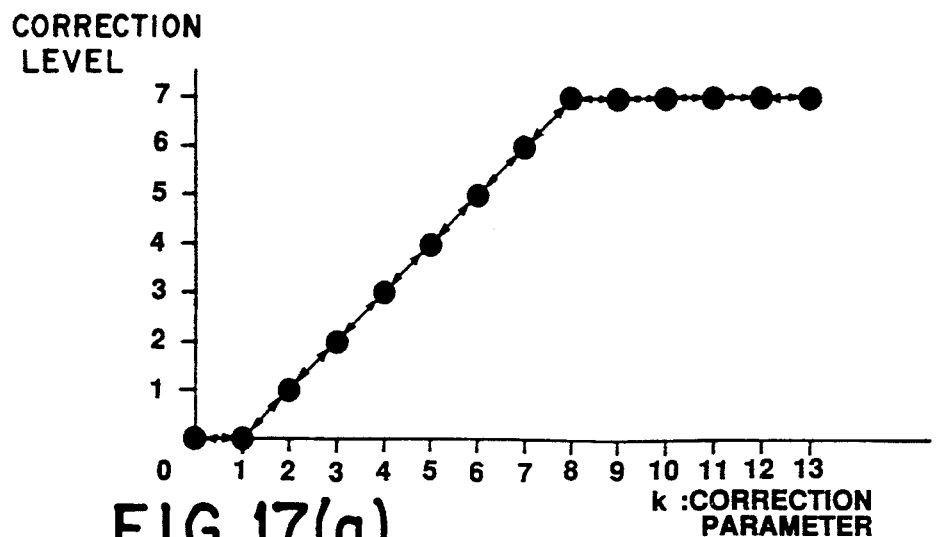
FIGS. 17(a) and (b) are explanatory diagrams showing the relationships between the correction parameter and correction level, and tracing methods.

In the fourth embodiment, the correction parameter k has a value ranging from 0 to 8. The relationship between the correction parameter k and correction level may be changed as shown in FIGS. 17(a) and (b). This will facilitate smooth switching between a normal mode and a correction mode.

In FIG. 17(a), the correction parameter k takes on some values with respect to a maximum correction level. Once severe color misregistration due to water supply is identified, the system cannot escape from the correction mode easily.

Figure 17B:
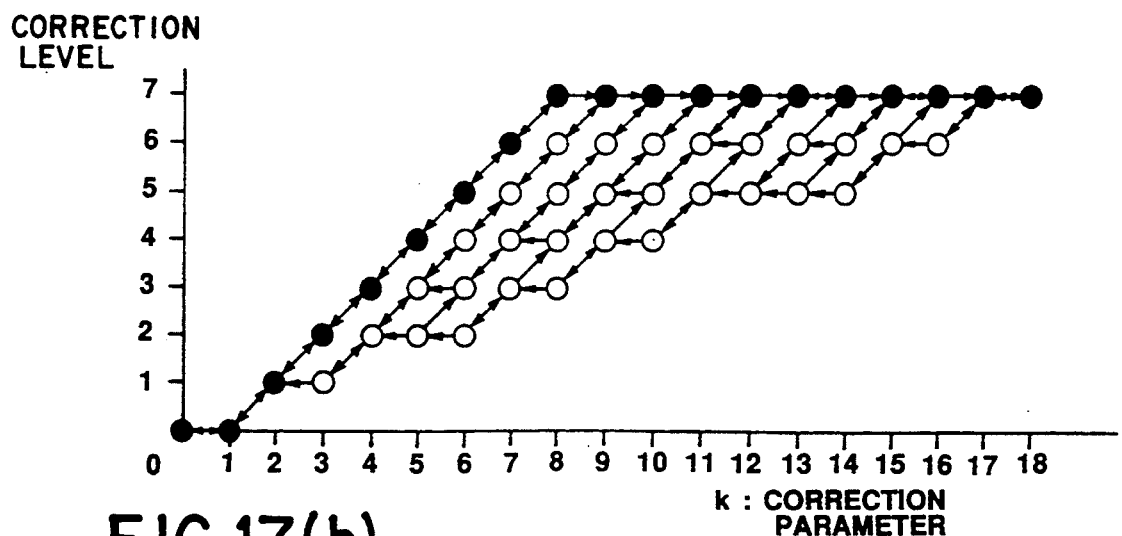

FIG. 17(b) shows a multi-trace method. In the multi-trace method, unlike a single-trace method of FIG. 17(a) in which a correction level is determined automatically depending on the correction parameter k, the next correction level is determined depending on a current correction level, a current value of the correction parameter k, and the next value of the correction parameter k. The multi-trace method facilitates smooth return to the normal mode after prolonged water supply.

In the fourth embodiment, as described previously, a simpler circuitry enables easing of color misregistration due to water supply.

In the fourth embodiment, as shown in FIG. 12, a synthesizing circuit 70 synthesizes color difference data $R-Y$ and $B-Y$. Alternatively, the synthesizing circuit 70 may synthesize primary color signals R, G, and B like a synthesizing circuit 70A for a variant shown in FIG. 18.

In this variant, an average color calculating circuit 69 is followed by a decoder 71A. The synthesizing circuit 70A synthesizes three primary color average signals R', G', and B' the decoder 71A outputs and three primary color real-time signals R, G, and B, then outputs three primary color correction signals R", G", and B" to a selector 72. The other components, operation, and advantages are identical to those of the fourth embodiment. The same numerals are assigned to the components. The description will be omitted.

In the aforesaid embodiments, averages of color differences are calculated as color information. Alternatively, averages of a hue and a saturation may be calculated as color information, then synthesized with an original luminance signal to produce a correction image signal. Otherwise, an average hue, an original saturation, and an original luminance may be synthesized. Other color space coordinate system may be employed to provide color information and to eventually generate a correction image signal. The aforesaid synthesis can be adopted to synthesize the color information.

Figure 19:
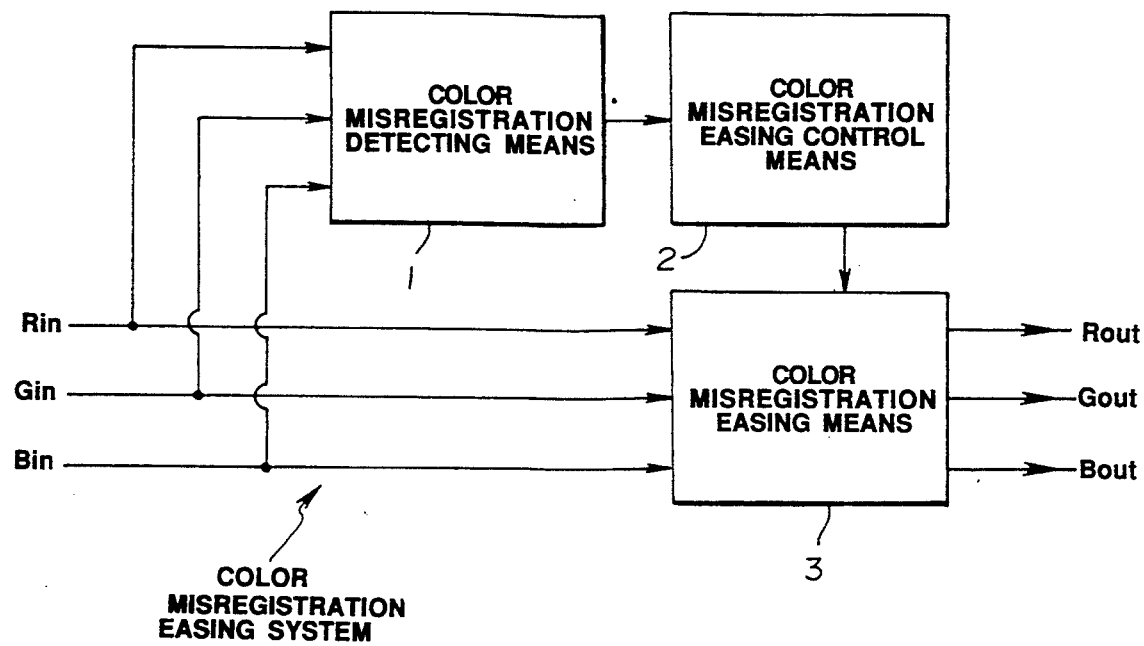
FIG. 19 is a conceptual diagram of a color misregistration easing system.

FIG. 19 is a conceptual diagram showing the fifth embodiment, a variant, and the sixth embodiment of the present invention.

A color misregistration easing system 4 shown in FIG. 19 comprises a color misregistration value detecting means 1 for using an input image signal (made up of Rin, Gin, and Bin) originating from a field sequential type imaging system, which is not shown, to calculate a degree of color misregistration in an image, and outputting the calculated data as a color misregistration value detected signal, a color misregistration easing control means 2 for generating a suppression signal for suppressing a quantity of color misregistration according to a color misregistration value detected signal sent from the color misregistration value detecting means 1, and a color misregistration easing means 3 for suppressing color misregistration in the input image signal according to the suppression signal sent from the color misregistration easing control means 2 and outputting the suppressed signal as a color misregistration suppressed image signal (made up of Rout, Gout, and Bout).

In the color misregistration easing system having the aforesaid configuration, the color misregistration value detecting means 1 uses an input image signal (made up of Rin, Gin, and Bin) originating from a field sequential type imaging system to calculate a degree of color misregistration in an image, and outputs the calculated data as a color misregistration value detected signal to the color misregistration easing control means 2. The color misregistration easing control means 2 generates a color misregistration suppression control signal according to the color misregistration value detected signal, then outputs the suppression control signal to the color misregistration easing means 3. The color misregistration easing means 3 suppresses color misregistration in the input image signal according to the color misregistration suppression control signal, then outputs the suppressed signal as an image signal with color misregistration suppressed (made up of Rout, Gout, and Bout).

The foregoing system detects a quantity of color misregistration in an input image and suppresses the color misregistration as described above. Thus, color misregistration can be suppressed effectively without installing an additional new mechanism or constructing another wiring.

Figure 20:
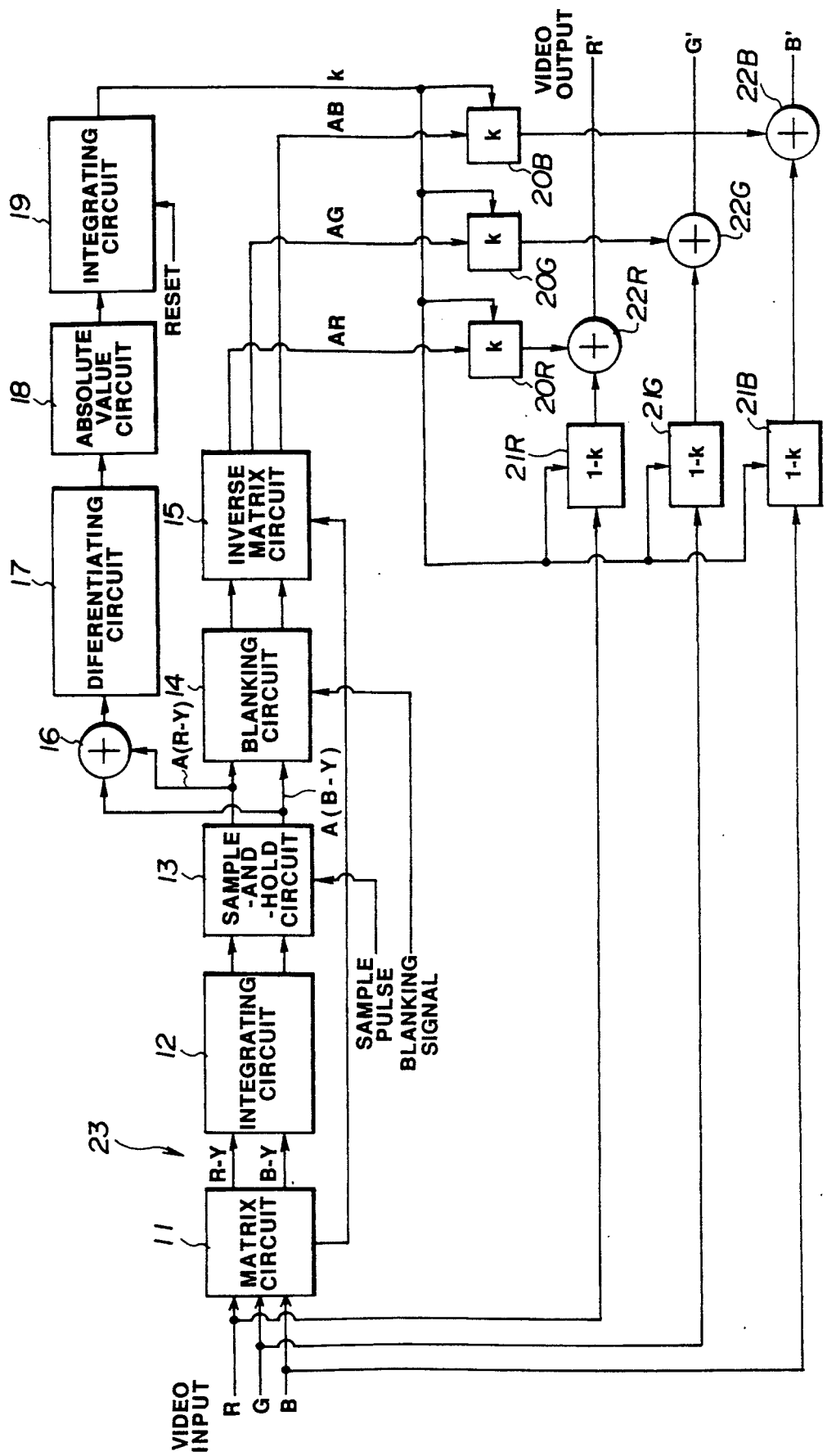
FIG. 20 is an overall block diagram of a color misregistration easing system according to the fifth embodiment.

FIG. 20 is an overall block diagram of a color misregistration easing system according to the fifth embodiment of the present invention.

A color misregistration easing system 23 shown in FIG. 20 comprises a matrix circuit 11 for converting video input signals R, G, and B originating from an electronic endoscope, which is not shown, or other field sequential type imaging system into color difference signals $R-Y$ and $B-Y$, and a luminance signal Y, an integrating circuit 12 for integrating the color difference signals $R-Y$ and $B-Y$, a sample-and-hold circuit 13 for sampling and holding signals the integrating circuit 12 outputs for each field at the timing of a sample pulse, and generating average color difference signals $A(R-Y)$ and $A(B-Y)$, a blanking circuit 14 for padding the average color difference signals $A(R-Y)$ and $A(B-Y)$ with blanking pulses and outputting the resultant average color difference signals, and an inverse matrix circuit 15 for using the average color difference signals the blanking circuit 14 outputs and the Y signal sent from the matrix circuit 11 to produce average R, G, and B signals or AR, AG, and AB.

For calculating a quantity of color misregistration, the color misregistration easing system 23 includes an adder 16 for adding the average color difference signals $A(R-Y)$ and $A(B-Y)$ the sample-and-hold circuit 13 outputs, a differentiating circuit 17 for differentiating an output signal of the adder 16 to provide a change of color components of fields, an absolute value circuit 18 for calculating an absolute value of the result of the differentiation, and an integrating circuit 19 for integrating an output signal of the absolute value circuit 18, fetching a quantity of color misregistration as a quantity of DC variation, and outputting the fetched data as a color misregistration suppression control signal k.

The integrating circuit 19 has, for example, two integrators that are not shown. In the integrating circuit 19, when one of the integrators integrates an input signal, the other integrator, which is not shown, outputs a signal integrated for the previous field period as a color misregistration suppression control signal k. The other integrator is reset immediately before the next field period, while one integrator outputs the integrated signal as a misregistration suppression control signal k.

Herein, the color misregistration suppression control signal k shall be larger than or equal to 0, and smaller than or equal to 1.

The color misregistration easing system 23 further comprises multiplying circuits 20R, 20G, and 20B for multiplying average R, G, and B signals by the color misregistration suppression control signal k the integrating circuit 19 outputs and thus producing kAR, kAG, and kAB, multiplying circuits 21R, 21G, and 21B for multiplying the video input signals R, G, and B by $(1-k)$ based on the color misregistration suppression control signal k and thus producing signals $(1-k)R$, $(1-k)G$, and $(1-k)B$, and adders 22R, 22G, and 22B for adding the signals kAR, kAG, and kAB and the signals $(1-k)R$, $(1-k)G$, and $(1-k)B$ and thus producing video outputs $R'=kAR+(1-k)R$, $G'=kAG+(1-k)G$, and $B'=kAB+(1-k)B$.

In the system having the aforesaid configuration, a matrix circuit 11 uses video input signals R, G, and B originating from a field sequential type imaging system to produce color difference signals $R-Y$ and $B-Y$ and a luminance signal Y. The color difference signals $R-Y$ and $B-Y$ are integrated by an integrating circuit 12, and sampled and held in fields by a sample-and-hold circuit 13. Then, average color difference signals A(R−Y) and A(B−Y) are produced. The average color difference signals A(R−Y) and A(B−Y) are subjected to blanking or provided with a blanking signal by a blanking circuit 14. Then, a matrix 15 synthesizes the Y signal and average color difference signals A(R−Y) and A(B−Y) and thus produces average color signals AR, AG, and AB.

For detecting a quantity of color misregistration, an adder 16 adds the average color difference signals A(R−Y) and A(B−Y). Then, a differentiating circuit 17 differentiates the added signal to provide a change of color components of fields. An absolute value circuit 18 calculates an absolute value of the result of the differentiation. An integrating circuit 19 integrates the absolute value. Thus, the quantity of color misregistration is fetched as a quantity of DC variation. The quantity of color misregistration the integrating circuit 19 has fetched is used as a color misregistration suppression control signal k to control multiplying circuits 20R, 20G, and 20B. The multiplying circuits 20R, 20G, and 20B multiply average color signals AR, AG, and AB by the color misregistration suppression control signal k ($0 < k < 1$) and thus produce average color signals kAR, kAG, and kAB.

On the other hand, the video input signals R, G, and B are multiplied by $(1-k)$ by multiplying circuits 21R, 21G, and 21B. Thus, color signals $(1-k)R$, $(1-k)G$, and $(1-k)B$ are produced. Then, the color signals $(1-k)R$, $(1-k)G$, and $(1-k)B$ are added by adders 22R, 22G, and 22B. Then, R″kaR+(1−k)R, G′=kaG+(1−k)G, and B′=kaB+(1−k)B are produced.

As described previously, a quantity of color misregistration is calculated using a quantity of a change of average colors of fields. According to the quantity of color misregistration, adding ratios for adding average color signals kAR, kAG, and kAB to original color signals R, G, and B are controlled. Then, a video output is provided. In short, when the quantity of color misregistration increases, the value of k approaches 1 gradually. In the video output signal, the primary color signals R, G, and B are gradually replaced by the average color signals kAR, kAG, and kAB. Thus, color misregistration is suppressed. Consequently, as easy-to-see video image is produced.

As the quantity of color misregistration decreases, the value of k approaches 0 gradually. A rate at which a video output signal is occupied by original colors increases gradually. When no color misregistration occurs, original colors are displayed as they are. Thus, the system will not carry out unnecessary color misregistration suppression.

In the system of this embodiment, color misregistration is suppressed effectively with a low-cost and simple circuitry.

In this embodiment, multiplying circuits 20R, 20G, and 20B for providing multiples of k and multiplying circuits 21R, 21G, and 21B for providing multiples of $(1-k)$ serve as color misregistration easing means and control signal levels. After that, adders 22R, 22G, and 22B carry out addition. Alternatively, a voltage variable resistor may be employed to control adding ratios.

Figure 21:
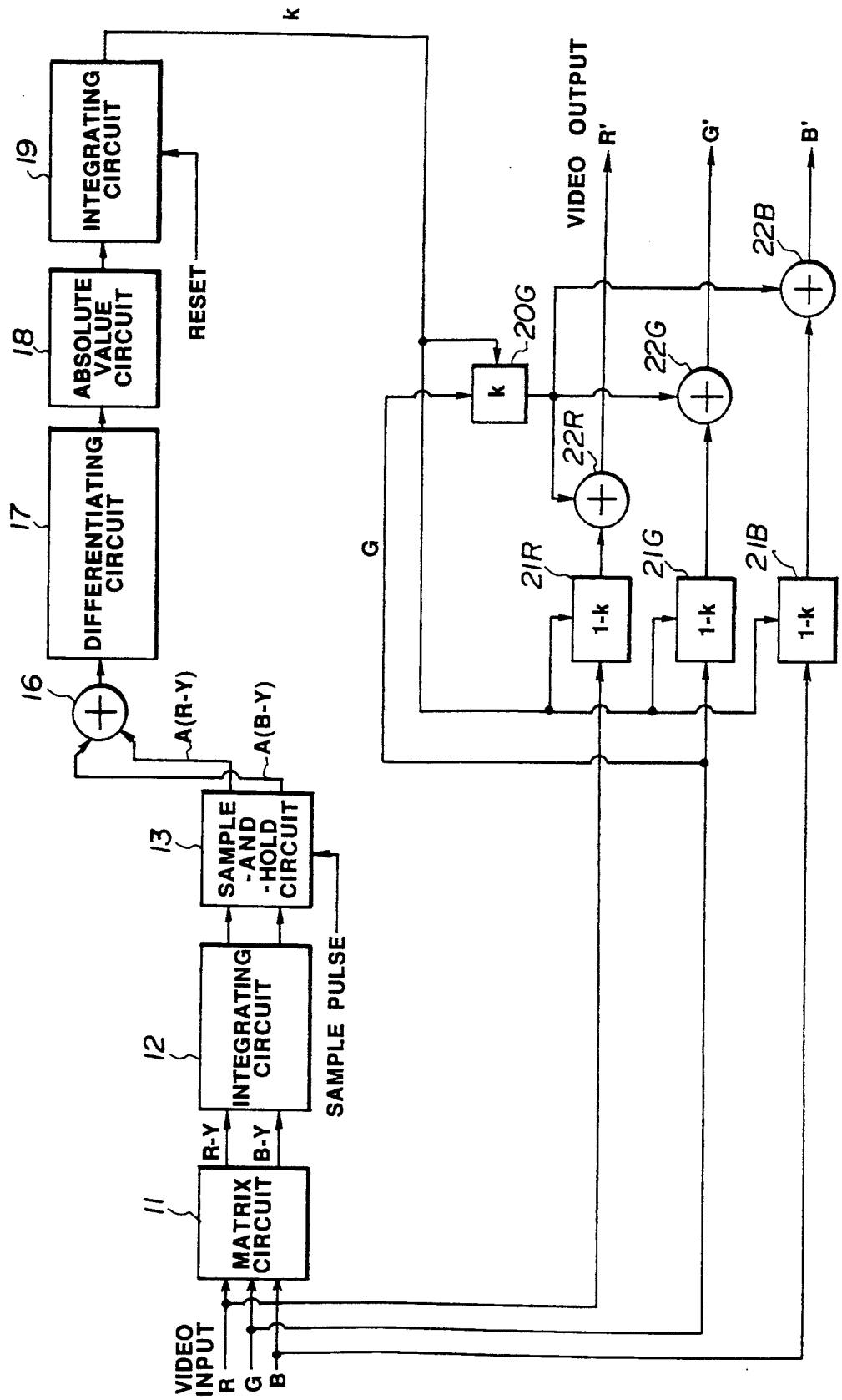
FIG. 21 is an overall block diagram of a color misregistration easing system according to the variant of the fifth embodiment.

FIG. 21 is an overall block diagram of a color misregistration easing system according to a variant of the present invention. As shown in FIG. 21, unlike the system of the fifth embodiment in which average color signals R, G, and B are used to suppress color misregistration, a color misregistration easing system 23A uses only a primary color signal G to replace primary color signals R, G, and B, and thus suppresses color misregistration.

Therefore, in this embodiment, a blanking circuit 14 and an inverse matrix circuit 15 are unnecessary. The other components identical to those of the fifth embodiment are assigned the same numerals. The components and the operation identical to that of the fifth embodiment will not be described.

A luminance signal Y a matrix circuit 11 outputs may be used on behalf of the primary color signal G to suppress color misregistration.

Figure 22:
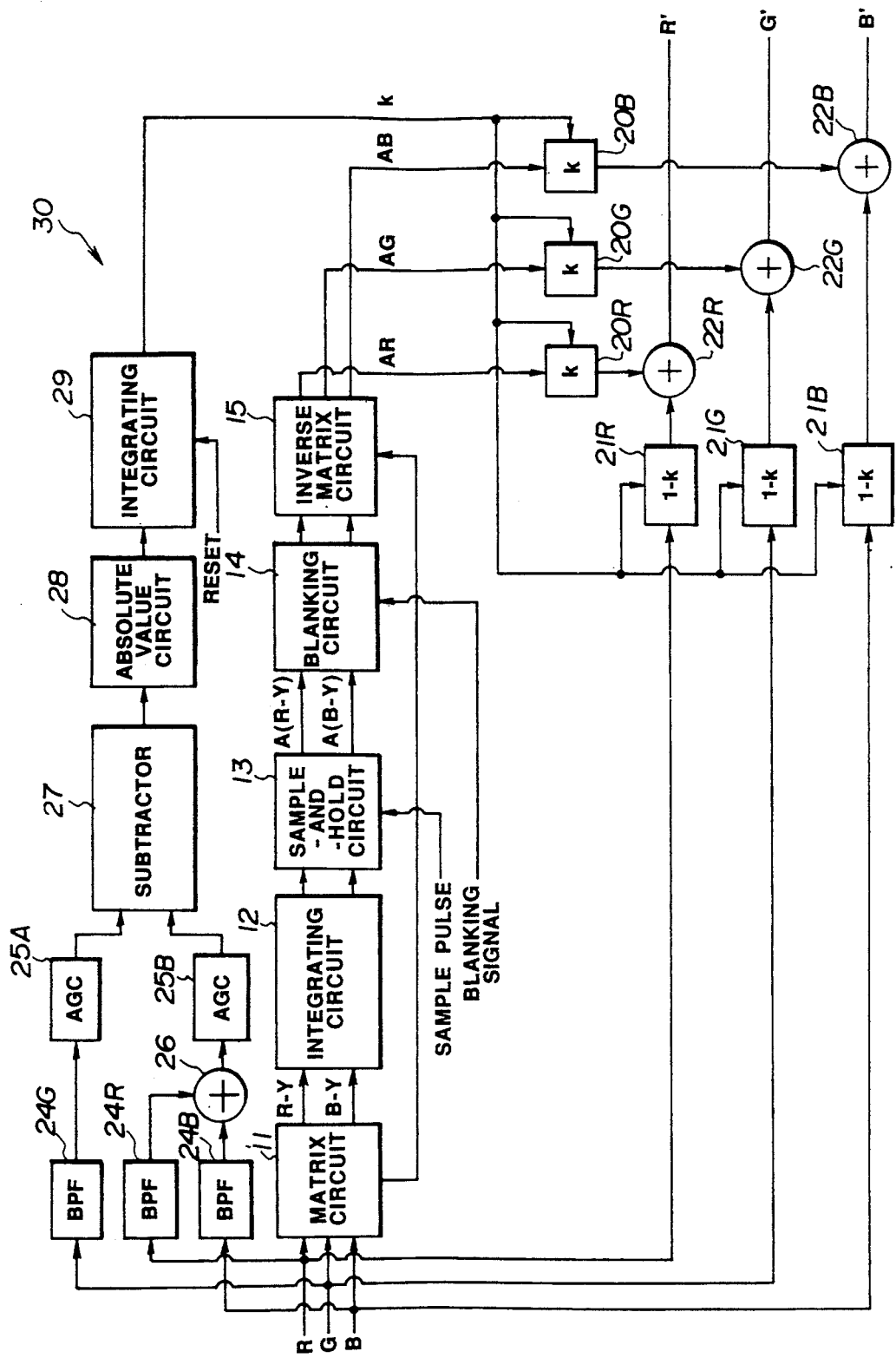
FIG. 22 is an overall block diagram of a color misregistration easing system according to the sixth embodiment.
Figure 23:
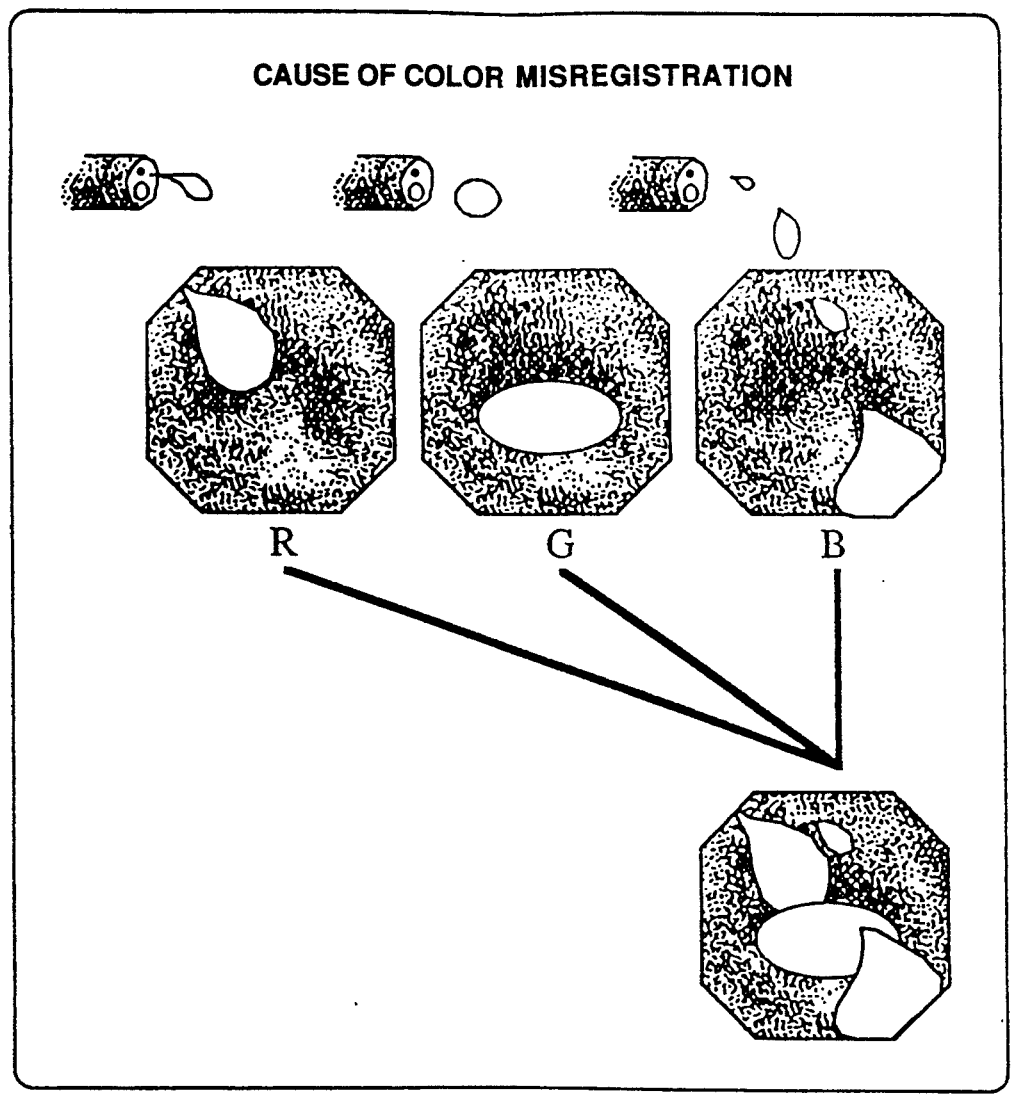
FIG. 23 is an explanatory diagram showing the cause of color misregistration.

FIG. 22 is an overall block diagram of a color misregistration easing system according to the sixth embodiment of the present invention.

A color misregistration easing system 30 of the present invention shown in FIG. 22, unlike the color misregistration easing system 23 of the fifth embodiment in which average color difference signals A(B−Y) and A(B−Y) a sample-and-hold circuit 13 provides are used to calculate a quantity of color misregistration, uses color signals R, G, and B originating from an imaging system to calculate a quantity of color misregistration. The other components identical to those of the fifth embodiment are assigned the same numerals. The components and the operation identical to that of the fifth embodiment alike will not be described.

As shown in FIG. 22, for detecting a quantity of color misregistration, a color misregistration easing system 30 comprises bandpass filters (hereafter, BPF) 24R, 24G, and 24B for extracting components from primary color signals R, G, and B, an adder 26 for adding the components of the color signals R and B passing through the BPFs 24R and 24B, and automatic gain control (hereafter, AGC) circuits 25A and 25B for matching the level of the added component of the color signals R and B the adder 26 provides and the level of the component of the color signal G passing through the BPF 24G.

The term "component" refers to a specific hue component of color information contained in each of primary color signals R, G, and B.

The color misregistration easing system 30 further comprises a subtractor 27 for subtracting the added component of the color signals R and B sent from the AGC circuits 25A and 25B and the component of the color signal G, and detecting a correlational deviation, an absolute value circuit 28 for calculating and outputting an absolute value of the output signal of the subtractor 27, and an integrating circuit 29 for integrating an output signal of the absolute value circuit, fetching a quantity of color misregistration as a quantity of DC variation, and producing a color misregistration suppression control signal k.

With input of the color misregistration suppression control signal k the integrating circuit 29 outputs, the multiplying circuits 20R, 20G, and 20B multiply the averaged color signals AR, AG, and AB by k ($0 \leq k \leq 1$) and output the multiplied signals as kAR, kAG, and kAB.

In the above configuration, for calculating a quantity of color misregistration, BPFs 24R, 24G, and 24B extract components of primary color signals R, G, and B, and an adder 26 adds components of color signals R and B. The component of the color signal G and the added component of the color signals R and B pass through AGC circuits 25A and 25B to have the same level.

Then, a subtractor 26 subtracts the components to provide a correlational deviation. An absolute value circuit 28 calculates an absolute value of the correlational deviation the subtractor 26 provides. Then, an integrating circuit 29 integrates the absolute value the absolute value circuit 28 calculates and provides a quantity of DC variation representing a quantity of color misregistration. Thus, a color misregistration suppression control signal k is generated. Multiplying circuits 20R, 20G, and 20B multiply average R, G, and B signals by k ($0 < k < 1$) based on the color misregistration suppression control signal k and thus produce kAR, kAG, and kAB. Then, multiplying circuits 21R, 21G, and 21B multiply the input primary signals R, G, and B by $(1-k)$ and thus produce $(1-k)R$, $(1-k)G$, and $(1-k)B$. Multiplying circuits 22R, 22G, and 22B produce video signals $R' = kAR + (1-k)R$, $G' = kAG + (1-k)G$, $B' = kAB + (1-k)B$.

As described above, in this embodiment, a deviation in the correlation between a component of a color signal G and components of color signals R and B for one screen is calculated to provide a quantity of color misregistration. The ratios of adding average color signals and primary color signals are controlled depending on the quantity of color misregistration. Consequently, a video signal whose color misregistration has been suppressed is displayed.

When a tissue is dyed with a yellow dye, the endoscopic image is mainly occupied with hue components of yellow and red. On the other hand, a normal endoscopic image is occupied with only a red component. A subtractor 27 provides an output representing a difference between an added component of red and blue and a green (yellow) component. Thereby, a normal image can be differentiated from an image produced after dying.

The other components, operation, and advantages are identical to those of the fifth embodiment. The description will be omitted.

In this embodiment, similarly to the fifth embodiment, a voltage variable resistor may be employed to control adding ratios. Similarly to the aforesaid variant, a G signal may be employed on behalf of an average color. Alternatively, the G signal may be replaced by a luminance signal Y to control color misregistration suppression.

In the present invention, it will be apparent that a wide range of different embodiments can be formed within the spirit of the invention. This invention will be restricted to the appended claims but not limited to any specific embodiment.

What is claimed is:

1. A color misregistration easing system for inputting a color image signal of a subject imaged by a field sequential imaging means and carrying out color misregistration easing, comprising:

a detecting means for using said color image signal to calculate a quantity of a change of color information of time-series screens before and after, and detecting color misregistration or an event leading to said color misregistration according to the calculated quantity;

an average color information producing means for using said color image signal to produce an average of color information of part or the whole of a screen, and updating said average color information according to a quantity of a change of varying color information of said time-series screens before and after in response to an instruction from said detecting means;

a means for generating a correction image signal of said subject using said average said average color information producing means provides; and a switching means for outputting said correction image signal generated by said generating means when said detecting means determines that color misregistration is present, and outputting said color image signal when said detecting means determines that color misregistration is absent.

2. A color misregistration easing system according to claim 1 wherein said detecting means detects said color misregistration of said screen resulting from relative movement between said imaging means and said subject.

3. A color misregistration easing system according to claim 1 further comprising a set color information producing means for producing a set value of said color information of part or the whole of said a screen, wherein said generating means uses said set value said set color information producing means provides to generate said correction image signal of said subject.

4. A color misregistration easing system according to claim 1 wherein said detecting means detects said color misregistration of said screen resulting from water supply said imaging means has performed.

5. A color misregistration easing system according to claim 1 wherein said detecting means calculates a quantity of a change of averages of said color information of said time-series screens before and after, and determines a degree of said color misregistration according to a time-sequential change in the calculated quantity of said change.

6. A color misregistration easing system according to claim 1 wherein said detecting means calculates a quantity of a change of averages of said color information of said time-series screens before and after and determines the presence or absence of said color misregistration according to a time-sequential change in the calculated quantity of said change.

7. A color misregistration easing system according to claim 1 wherein said generating means includes a means for synthesizing said average of said color information said average color information producing means provides with said color image signal originating from said imaging means.

8. A color misregistration easing system according to claim 1 wherein said average color information producing means is an average color difference producing means that uses said color image signal to calculate average color differences.

9. A color misregistration easing system according to claim 1 wherein said generating means synthesizes said average of color information calculated using said color image signal and luminance information calculated using said color image signal, and thus generates said correction image signal.

10. A color misregistration easing system according to claim 1 wherein said detecting means uses said color image signal to calculate an average of color information of part or the whole of a screen of one field or more, compares between averages of given fields before and after, and identifies the presence or absence, or degree of said color misregistration according to a time-sequential change in the quantity of a change of said averages or depending on whether the quantity of said change of said averages exceeds a predetermined value.

11. A color misregistration easing system according to claim 6 wherein said detecting means includes an integrating means for integrating said color information in units of one horizontal period or more and thus providing an average of said color information.

12. A color misregistration easing system according to claim 7 wherein said detecting means calculates a quantity of a change of averages of said color information and varies a synthetic ratio for said synthesizing means according to a time-sequential change in the calculated quantity of said change.

13. A color misregistration easing system according to claim 8 wherein said generating means includes an average color producing means for using said average color differences said averaging color difference producing means provides to calculate averages of three primary color signals and a means for synthesizing said averages of three primary colors provided by said averaging color producing means with said color image signal, and said detecting means calculates a quantity of a change of averages of said color information of said time-series screens before and after, and varies a synthetic ratio for said synthesizing means according to the calculated quantity of said change.

14. A color misregistration easing system according to claim 10 wherein said average of said color information said detecting means calculates is an average hue.

15. A color misregistration easing system according to claim 10 wherein said given fields before and after of which said detecting means calculates said average for comparison is three fields.

16. A color misregistration easing system according to claim 10 wherein said predetermined value is 8 degrees.

17. A color misregistration easing system according to claim 10 wherein said detecting means sets a correction parameter to be updated according to said quantity of said change of said averages of said color information, and determines the presence or absence, or degree of said color misregistration.

18. A color misregistration easing system according to claim 11 wherein said detecting means includes an average color calculating means for calculating a hue average using values said integrating means provides by integrating color differences of at least a given range of one field screen.

19. A color misregistration easing system according to claim 17 wherein said detecting means adds a given value to an initial value of said correction parameter when said quantity of said change of said averages of said color information exceeds said predetermined value, and subtracts said given value from another initial value of said correction parameter when said quantity of said change of said averages of said color information is smaller than said predetermined value.

20. A color misregistration easing system according to claim 19 wherein said detecting means counts a number of times when said correction parameter exceeds said predetermined value, and determines that color misregistration is present when said number of times exceeds a predetermined number of times.

21. A color misregistration easing system according to claim 1 wherein said detecting means instructs said average color information producing means to update said average of said color information only when said quantity of said change of said color information is not less than a set value.

* * * * *